(12) United States Patent
van Toor et al.

(10) Patent No.: US 7,585,990 B2
(45) Date of Patent: Sep. 8, 2009

(54) LOW TRANS-FATTY ACID FAT COMPOSITIONS; LOW-TEMPERATURE HYDROGENATION, E.G., OF EDIBLE OILS

(75) Inventors: Hans van Toor, Zoetermeer (NL); Gijsbertus Johannes van Rossum, Hoogvliet (NL); Marco Kruidenberg, Oostvoorne (NL)

(73) Assignee: Cargill, Incorporated, Wayzata, MN (US)

( * ) Notice: Subject to any disclaimer, the term of this patent is extended or adjusted under 35 U.S.C. 154(b) by 162 days.

(21) Appl. No.: 10/750,457

(22) Filed: Dec. 31, 2003

(65) Prior Publication Data

US 2005/0027136 A1 Feb. 3, 2005

Related U.S. Application Data

(60) Provisional application No. 60/492,160, filed on Jul. 31, 2003, provisional application No. 60/525,914, filed on Nov. 30, 2003.

(51) Int. Cl.
*C07C 51/36* (2006.01)
(52) U.S. Cl. ...................................... 554/141; 426/603
(58) Field of Classification Search ................ 554/141, 554/147
See application file for complete search history.

(56) References Cited

U.S. PATENT DOCUMENTS

| | | | |
|---|---|---|---|
| 3,856,710 A | 12/1974 | Moulton et al. |
| 4,088,603 A | 5/1978 | Carter et al. |
| 4,134,905 A | 1/1979 | Hasman |
| 4,184,982 A | 1/1980 | Schroeder et al. |
| 4,188,333 A | 2/1980 | Cahen |
| 4,209,547 A | 6/1980 | Scarpiello et al. |
| 4,213,882 A | 7/1980 | Kranich |
| 4,228,088 A | 10/1980 | Kuiper |
| 4,229,361 A | 10/1980 | Cahen |
| 4,251,672 A | 2/1981 | Carter |
| 4,260,643 A | 4/1981 | Cochran |
| 4,263,225 A | 4/1981 | Carter |
| 4,278,609 A | 7/1981 | Kuiper |
| 4,307,026 A | 12/1981 | Kuiper |
| 4,317,748 A | 3/1982 | Torok |
| 4,326,932 A | 4/1982 | Froling |
| 4,356,197 A | 10/1982 | Devitt |

(Continued)

FOREIGN PATENT DOCUMENTS

EP 0 021 528 B1 3/1983

(Continued)

OTHER PUBLICATIONS

Maskaev et al., Khimiya i Tekhnologiya Topliv i Masel, No. 6, pp. 19-20, 1973.*

(Continued)

*Primary Examiner*—Deborah D Carr

(57) ABSTRACT

The present disclosure provides low trans-fatty acid fat compositions, methods of hydrogenating unsaturated feedstocks (e.g., oils), and hydrogenation catalyst compositions. One exemplary method involves producing an activated catalyst composition by heating a nickel-based catalyst to a first temperature of at least about 100° C. in the presence of hydrogen and a fat component. An unsaturated feedstock may be contacted with the activated catalyst composition and hydrogenated by sustaining a hydrogenation reaction at a second temperature of no greater than about 70° C. Some specific implementations of the invention permit the production of partially hydrogenated seed oils with low trans-fatty acid contents.

69 Claims, 1 Drawing Sheet

U.S. PATENT DOCUMENTS

| | | | |
|---|---|---|---|
| 4,385,001 A | 5/1983 | Rosen | |
| 4,399,007 A | 8/1983 | Froling | |
| 4,424,162 A | 1/1984 | Rosen | |
| 4,424,163 A | 1/1984 | Rosen | |
| 4,430,350 A | 2/1984 | Tresser | |
| 4,479,902 A | 10/1984 | Rosen | |
| 4,510,091 A | 4/1985 | Rosen | |
| 4,510,092 A | 4/1985 | Rosen | |
| 4,519,951 A | 5/1985 | Qualeatti | |
| 4,547,319 A | 10/1985 | Qualeatti | |
| 4,584,139 A | 4/1986 | Gray | |
| 4,590,007 A | 5/1986 | Tucker | |
| 4,626,604 A | 12/1986 | Hiles | |
| 4,666,635 A | 5/1987 | Klimmek | |
| 4,670,416 A | 6/1987 | Klimmek | |
| 4,696,911 A * | 9/1987 | Boerma et al. | 554/147 |
| 4,725,573 A | 2/1988 | Mesters | |
| 4,786,402 A | 11/1988 | Anstock | |
| 4,847,016 A | 7/1989 | Gobel | |
| 4,871,485 A | 10/1989 | Rivers | |
| 4,960,960 A | 10/1990 | Harrison | |
| 4,973,430 A | 11/1990 | Rivers | |
| 5,087,599 A | 2/1992 | Botman | |
| 5,112,792 A | 5/1992 | Lok | |
| 5,223,470 A | 6/1993 | Bouwman | |
| 5,225,581 A | 7/1993 | Pintauro | |
| 5,298,638 A | 3/1994 | Toneboehn | |
| 5,354,877 A | 10/1994 | Behr | |
| 5,360,920 A | 11/1994 | Weber | |
| 5,399,792 A | 3/1995 | Demmering | |
| 5,463,096 A | 10/1995 | Lok | |
| 5,470,598 A | 11/1995 | Scavone | |
| 5,492,877 A | 2/1996 | Gubitosa | |
| 5,498,587 A | 3/1996 | Deckers | |
| 5,599,376 A | 2/1997 | Camp | |
| 5,674,796 A | 10/1997 | Lee | |
| 5,693,835 A | 12/1997 | Konishi | |
| 5,734,070 A | 3/1998 | Tacke | |
| 5,863,589 A | 1/1999 | Covington | |
| 5,885,643 A | 3/1999 | Kodali | |
| 5,912,041 A | 6/1999 | Covington | |
| 5,962,711 A | 10/1999 | Harrod | |
| 5,981,781 A | 11/1999 | Knowlton | |
| 6,033,703 A | 3/2000 | Roberts | |
| 6,113,976 A | 9/2000 | Chiou | |
| 6,129,789 A | 10/2000 | Kawase | |
| 6,218,556 B1 | 4/2001 | Pintauro | |
| 6,229,032 B1 | 5/2001 | Jacobs | |
| 6,265,596 B1 | 7/2001 | Harrod | |
| 6,365,558 B2 | 4/2002 | Lal | |
| 6,383,992 B1 | 5/2002 | Garmier | |
| 6,391,369 B1 | 5/2002 | Kincs | |
| 6,420,322 B1 | 7/2002 | Kodali | |
| 6,452,029 B1 | 9/2002 | Hillion | |
| 6,544,579 B1 | 4/2003 | Landon | |
| 2002/0016519 A1 | 2/2002 | Lok | |
| 2004/0146626 A1 | 7/2004 | Higgins | |
| 2007/0179305 A1 | 8/2007 | Van Toor et al. | |

FOREIGN PATENT DOCUMENTS

| | | |
|---|---|---|
| EP | 0 021 527 B1 | 5/1983 |
| EP | 0 114 704 A2 | 8/1984 |
| EP | 0 120 122 A2 | 10/1984 |
| EP | 0 215 563 A2 | 3/1987 |
| EP | 0 230 971 A2 | 8/1987 |
| EP | 0 246 366 A1 | 11/1987 |
| EP | 246366 * | 11/1987 |
| EP | 0 277 230 | 8/1988 |
| EP | 0 291 303 | 11/1988 |
| EP | 0 300 018 B1 | 1/1989 |
| EP | 0 314 044 A2 | 5/1989 |
| EP | 0 389 158 | 9/1990 |
| EP | 0 398 668 | 11/1990 |
| EP | 0 429 995 A2 | 6/1991 |
| EP | 0 472 918 A1 | 3/1992 |
| EP | 0 528 850 A1 | 3/1993 |
| EP | 0 534 524 A2 | 3/1993 |
| EP | 0 569 110 A1 | 11/1993 |
| EP | 0 572 081 A1 | 12/1993 |
| EP | 0 114 704 B2 | 1/1995 |
| EP | 0 654 074 B1 | 5/1995 |
| EP | 0 665 287 A2 | 8/1995 |
| EP | 0 674 698 A1 | 10/1995 |
| EP | 0 703 728 B1 | 4/1996 |
| EP | 0 745 116 B1 | 12/1996 |
| EP | 0 757 031 A2 | 2/1997 |
| EP | 0 791 041 B1 | 8/1997 |
| EP | 0 831 713 B1 | 4/1998 |
| EP | 0 917 561 B1 | 5/1999 |
| EP | 0 921 728 | 6/1999 |
| EP | 1 057 887 A1 | 12/2000 |
| EP | 1 154 854 A1 | 11/2001 |
| WO | WO-88/00855 A1 | 2/1988 |
| WO | WO-88/05767 | 8/1988 |
| WO | WO-91/17667 A1 | 11/1991 |
| WO | WO-94/03566 A1 | 2/1994 |
| WO | WO-94/11472 A1 | 5/1994 |
| WO | WO-94/15478 A1 | 7/1994 |
| WO | WO-95/00035 A1 | 1/1995 |
| WO | WO-95/00036 A1 | 1/1995 |
| WO | WO-95/22591 A1 | 8/1995 |
| WO | WO-96/01304 A1 | 1/1996 |
| WO | WO-97/43907 A1 | 11/1997 |
| WO | WO-98/54275 A2 | 12/1998 |
| WO | WO-00/47320 A1 | 8/2000 |
| WO | WO-02/00815 A2 | 1/2002 |
| WO | WO-03/059505 A1 | 7/2003 |
| WO | WO-03/353152 A2 | 7/2003 |
| WO | WO03/080779 A1 | 10/2003 |
| WO | WO-03/080779 A1 | 10/2003 |
| WO | WO 2004/068960 A1 | 8/2004 |
| WO | WO2004/068960 A1 | 8/2004 |

OTHER PUBLICATIONS

"PRICAT Catalysts for the Hydrogenation of Edfible Oils," http://www.synetix.com/edibleoils/applications-edibleoils.htm, 2 pages Jul. 25, 2003.

Anderson, J.A., et al., "Influence of the Support in the Selectivity of NI Clay Catalysts for Vegetable Oil Hydrogenation," Amer Chemical Soc.,: 2485-2490 Oct. 1993.

Andrade, G.M.S., et al., "A Statistical Evaluation of the Effects of Process Variables During Catalytic Hydrogenation of Passion Fruit (*Passiflora edulis*) Seed Oil," Braz. J. Chem. Eng., vol. 15, No. 1, ISSN 0104-6632, 12 pages, Mar. 1998.

Balakos, M.W., et al., "Catalyst characteristics and performance in edible oil hydrogenation," Catalysis Today 35 (4): 415-425 Apr. 11, 1997.

Bayer, E., et al., "Selective Hydrogenation of Oleic Acid-Rich Oils in Aqueous-Medium by a PVP-NI-Catalyst," Fett Wissenchaft Technologie-Fat Science Technology, Mar. 1992, pp. 79-82, 94 (3), Konradin Industrieverlag GMBH, Germany.

Behr, A., "Selective Hydrogenation of Multi-Unsaturated Fatty-Acids in the Liquid-Phase," Fett Wissenchaft Technologie-Fat Science Technology, Jan. 1993, pp. 2-11, 95(1), Konradin Industrieverlag GMBH, Germany.

Bernas, A., et al., "Influence of Hydrogen Preactivation on the Linoleic Acid Isomerization Properties of Supported Ruthenium Catalyst," 2003, pp. 3-10, vol. 78, No. 1, Budapest.

Bhering, D. et al., "Preparation of High Loading Silica-Supported Nickel Catalyst: Analysis of the Reduction Step," Applied Catalysis A: General, 2002, pp. 55-64, 234 (1).

Brehm, A., et al., "Use of Platinum-Loaded Y-Zeolites as Catalysts for Hydrogenation of Liquid and Low-Melting Fats," Chemie Ingenieur Technik, Dec. 1989, pp. 963-964, vol. 61 (12).

Choo, H.P., et al., "Activity and selectivity of noble metal colloids for the hydrogenation of polyunsaturated soybean oil," J Mol Catal A-Chem 191 (1): 113-121 Jan. 2, 2003.

Choo, H.P., et al., "Hydrogenation of palm olein catalyzed by polymer stabilized Pt colloids," Journal of Molecular Catalysis A: Chemical 165: 127-134 2001.

Chung, C.S. et al., "Catalyst Preparation and Support Effects for Triglyceride Hydrogenation over Supported Nickel," J Chem. Tech. Biotechnol, 1987, pp. 15-30, vol. 38, Great Britain.

Drozdowski, B., et al., "Effect of rapeseed oil hydrogenation conditions on trans isomers formation," Eur. J. Lipid Sci. Technol. 102: 642-645 2000.

Ferreras, J.F., et al., "Influence of the Clay and the Nickel Content in Catalysts for Vegetable Oil Hydrogenation," React. Kinet. Catal. Lett., vol. 53, No. 1: 1-6 1994.

Fillion, B. et al. "Gas-liquid mass-transfer and hydrodynamic parameters in a soybean oil hydrogenation process under industrial conditions," Ind Eng Chem Res 39 (7): 2157-2168 Jul. 2000.

Fillion, B., et al., "Kinetics, Gas-Liquid Mass Transfer, and Modeling of the Soybean Oil Hydrogenation Process," Ind. Eng. Chem. Res.: 697-709 2002.

Furlong, K., "The Low Trans Challenge", Oils and Fats International, Jul. 2004, pp. 30-31.

Gonzales-Marcos, M.P., et al., "Nickel on Silica Systems. Surface Features and Their Relationship with Support, Preparation Procedure and Nickel Content," Appl Catal A-Gen 162 (1-2): 269-280 Nov. 18, 1997.

Gonzales-Marcos, M.P., et al., Effect of Thermal Treatments on Surface Chemical Distribution and Catalyst Activity in Nickel on Silica Systems, J Mol Catal A-Chem 120 (1-3): 185-196, Jun. 13, 1997.

Gonzales-Marcos, M.P., et al., "Control of the Product Distribution in the Hydrogenation of Vegetable Oils over Nickel on Silica Catalysts," The Canadian Journal of Chemical Engineering, vol. 76: 927-935 Oct. 1998.

Grau, R. J., et al., "The Cup-and-Cap Reactor: A Device To Eliminate Induction Times in Mechanically Agitated Slurry Reactors Operated with Fine Catalyst Particles," Ing. Eng. Chem. Res., vol. 26, No. 1, 18-22, 1987.

Herrero, J., et al., "Catalytic Behaviour of Rhodium Supported on Palygorskite, Silica and Titania in Oil Hydrogenation," Applied Catalysis A: General, 86: 37-43, 1992.

Hsu, N, et al., "Catalytic Behaviour of Palladium in the Hydrogenation of Edible Oils," J. Am Oil Chem Soc, 65 (3): 349-356, Mar. 1988.

Ilinitch, O.M., "Nanosize Palladium Loaded Catalytic Membrane: Preparation and Cis-Trans Selectivity in Hydrogenation of Sunflower Oils," Stud Surf Sci Catal 118: 55-61 1998.

Jart, A., "The magnetic field as an additional selectivity parameter in fat hydrogenation," J Am Oil Chem Soc 74 (5): 615-617 May 1997.

Jovanovic, D., et al., "Nickel hydrogenation catalyst for tallow hydrogenation and for the selective hydrogenation of sunflower seed oil and soybean oil," Catal Today 43 (1-2): 21-28 Aug. 13, 1998.

Jovanovic, D., et al., "The influence of the isomerization reactions on the soybean oil hydrogenation process," J Mol Catal A-Chem 159 (2): 353-357, 2000.

Ju, J.W., et al., "Effects of alcohol type and amounts on conjugated linoleic acid formation during catalytic transfer hydrogenation of soybean oil," J Food Sci 68 (6): 1915-1922 Aug. 2003.

Ju, J.W., et al., "Formation of conjugated linoleic acids in soybean oil during hydrogenation with a nickel catalyst as affected by sulfur addition," J Agr Food Chem 51 (10): 3144-3149, May 7, 2003.

Jung, M.O., et al., "CLA Formation in Oils During Hydrogenation Process as Affected by Catalyst Types, Catalyst Contents, Hydrogen Pressure, and Oil Species," JAOCS, vol. 79, No. 5: 501-510 2002.

Jung, M.O., et al., "Effects of Temperature and Agitation Rate on the Formation of Conjugated Linoleic Acids in Soybean Oil during Hydrogenation Process," J. Agric. Food Chem.: 3010-3016 2001.

King, J., et al., "Hydrogenation of Vegetable Oils Using Mixtures of Supercritical Carbon Dioxide and Hydrogen," JAOCS, vol. 78 No. 2 107-113 2001.

Kitayama, Y., et al., "Catalytic Hydrogenation of Linoleic Acid over Platinum-Group Metals Supported on Alumina," JAOCS, vol. 74, No. 5: 525-529 1997.

Koseoglu, S.S., et al., "Recent Advances in Canola Oil Hydrogenations," J Am Oil Chem Soc 67 (1): 39-47 Jan. 1990.

List, G.R., et al., "Hydrogenation of Soybean Oil Triglycerides: Effect of Pressure on Selectivity," JAOCS, vol. 77, No. 3: 311-314 2000.

M.B. Macher, A. Holmqvist, "Hydrogenation of palm oil in near-critical and supercritical propane," Eur J Lipid Sci Tech 103 (2): 81-84 Feb. 2001.

Mangnus G., "Hydrogenation of Oils at Reduced TFA Content", Oils and Fats International, Jul. 2004, pp. 33-35.

Mondal, K., et al., "Mediator-assisted electrochemical hydrogenation of soybean oil," Chemical Engineering Science: 2643-2656 2003.

Naglic, M., et al., "Kinetics of Catalytic Transfer Hydrogenation of some Vegetable Oils," JAOCS, vol. 75, No. 5: 629-633 1998.

Nele, M., et al., "Preparation of high loading silica supported nickel catalyst: simultaneous analysis of the precipitation and aging steps," Appl Catal A-Gen 178(2): 177-189 Mar. 22, 1999.

Parry, J.D., et al., "The Hydrogenation of Triglycerides Using Supported Alloy Catalysts. I. Silica-Supported Ni-Ag Catalysts," J Chem Technol Biot 50 (1): 67-80 1991.

Parry, J.D., et al., "The Hydrogenation of Triglycerides Using Supported Alloy Catalysts. II. Silica-Supported Pd-Cu Catalysts," J Chem Technol Biot 50 (1): 81-90 1991.

Ravasio, N., et al., "Environmental friendly lubricants through selective hydrogenation of rapeseed oil over supported copper catalysts," Applied Catalysis A: General 233: 1-6 2002.

Santacesaria, E., et al., "Role of mass transfer and kinetics in the hydrogenation of rapeseed oil on a supported palladium catalyst," Applied Catalysts A: General 116: 269-294 1994.

Schoon, N.H., "Is a Low Trans Content Attainable by Conventional Hydrogenation of Vegatable Oils?", Oils-Fats-Lipids, Proceedings of the 21st World Congress of the International Society for Fat Research (ISF), The Hague: 155-158 Oct. 1995.

Simon, P., et al., "A Simplified Horiuti-Polanyi Scheme for the Hydrogenation of Triacylglycerols," JAOCS, vol. 68, No. 2: 74-78 Feb. 1991.

Smidovnik, A., et al., "Catalytic Transfer Hydrogenation of Soybean Oil," JAOCS, vol. 69, No. 5: 405-409 May 1992.

Smidovnik, A., et al., "Kinetics of Catalytic Transfer Hydrogenation of Soybean Oil," JAOCS, vol. 71, No. 5: 507-511 May 1994.

Suh, D.J., et al., "Nickel-alumina composite aerogels as liquid-phase hydrogenation catalysts," J Non-Cryst Solids 285 (1-3): 309-316 Jun. 1, 2001.

Takeya, K. et al., "Hydrogenation of Soybean Oil by Loop Reactor Equiped with Venturi Nozzle," J Jpn Soc Food Sci 42 (4): 237-247 1995.

Takeya, K., et al., "Influence of Nitrogen Gas on Hydrogenation of Corn Oil .2. Novel Method of Edible Oil Hydrogeneration," J Jpn Soc Food Sci 43 (4): 417-422 1996.

Takeya, K., et al., "Novel Method of Edible Oil Hydrogenation .1. Influence of Inert-Gases on Hydrogenation of Soybean Oil," J Jpn Soc Food Sci 42 (6): 410-418 1995.

Takeya, K., et al., "Soybean oil hydrogenation using hydrogen storage alloy .3. Novel method of edible oil hydrogenation," J Jpn Soc Food Sci 43 (5): 502-509 1996.

Thomson, A., et al., "Silica-Supported Alloy Catalysts for Triglyceride Hydrogenation: The preparation and Properties fo Pd-Ag and Pd-Ni Systems," J Chem Technol Biot 37 (4): 257-270 1987.

Veldsink, J., "Selective Hydrogenation of Sunflower Seed Oil in a Three-Phase Catalytic Membrane Reactor," JAOCS, vol. 78, No. 5: 443-446 2001.

Veldsink, J.W., et al., "Heterogeneous hydrogenation of vegetable oils: A literature review," Catal Rev 39 (3): 253-318 1997.

Wang, Y.Q., et al., "A natural seed oil rich in omega6 and omega3 fatty acids," http://www.unl.ac.uk/ibchn/publication/pns01_02.pdf, 1 page, 2002.

Warner, K., et al., "Electrochemical Hydrogenation of Edible Oils in a Solid Polymer Electrolyte Reactor. Sensory and Compositional Characteristics of Low Trans Soybean Oils," JAOCS, vol. 77, No. 10 1113-1117 2000.

Weidong, A., et al., "The Electrochemical Hydrogenation of Edible Oils in a Solid Polymer Electrolyte Reactor. I. Reactor Design and Operation," JAOCS, vol. 75, No. 8: 917-925 1998.

Weidong, A., et al., The Electrochemical Hydrogenation of Edible Oils in a Solid Polymer Electrolyte Reactor. II. Hydrogenation Selectivity Studies, JAOCS, vol. 76, No. 2: 215-222 1999.

Wright, A.J., et al., "Cis selectivity of mixed catalyst systems in canola oil hydrogenation," Food Research International: 797-804 2003.

Yusem, G., et al., "Electrocatalytic hydrogenation of soybean oil in a radial flow-through Raney nickel powder reactor," Journal of Applied Electrochemistry: 989-997 1996.

Yusem, G.J., et al., "The Electrocatalytic Hydrogenation of Soybean Oil," JAOCS, vol. 69, No. 5: 399-404 May 1992.

* cited by examiner

LOW TRANS-FATTY ACID FAT COMPOSITIONS; LOW-TEMPERATURE HYDROGENATION, E.G., OF EDIBLE OILS

CROSS-REFERENCE TO RELATED APPLICATIONS

This application claims the benefit of U.S. Provisional Patent Application Nos. 60/492,160 filed Jul. 31, 2003, and 60/525,914 filed Nov. 30, 2003.

TECHNICAL FIELD

The present invention relates generally to hydrogenation processes and hydrogenation catalysts. The methods and catalyst compositions described below have particular utility in connection with hydrogenation of edible and non-edible oils.

BACKGROUND

Most seed oils and vegetable oils, such as soybean oil, canola oil, corn oil, sunflower oil, palm oil, or linseed oil, contain a variety of saturated and unsaturated fatty acids. The fatty acid profiles of oils commonly vary by source, but typically include a variety of saturated fatty acids, such as palmitic acid (C16:0) and stearic acid (C18:0); some monounsaturated fatty acids such as oleic acid (C18:1) and erucic acid (C22:1); and polyunsaturated fatty acids including linoleic acid (C18:2) and linolenic acid (C18:3). (The Cx:y designation refers to fatty acids wherein x is the number of carbon atoms and y is the number of double bonds.)

Polyunsaturated fatty acids, particularly linolenic acid (C18:3), have been found to lead to unacceptable rancid flavors in oil during baking, frying, etc. High contents of linolenic acid can also render edible oils unstable and easily oxidized during cooking and storage, which compromises the sensory characteristics of foods cooked in such oils. Many food oils are hydrogenated to increase stability by reducing the amount of linolenic acid and increasing saturated and monounsaturated fatty acids. For example, the maximum desirable linolenic acid content for many commercial frying oils is about two weight percent of the total fatty acid content of the oil.

Hydrogenating (mono)unsaturated fatty acids increases the saturated fatty acid content. Unduly high saturated fatty acid content in edible hydrogenated fat products, e.g., food oils, can adversely impact cardiovascular health by raising serum cholesterol levels. As a byproduct of hydrogenation, unsaturated fatty acids can be converted from their natural cis configuration to their trans isomer form. Recent studies have indicated that trans-fatty acids can impact cardiovascular health more negatively than saturated fatty acids do. In part due to this recent research, consumers are focusing more on trans-fatty acid content of edible hydrogenated fat products, with lower trans-fatty acid content being preferred by most consumers.

A variety of hydrogenation catalysts are known in the art. Each of them has its shortcomings, though. Some particularly active catalysts, such as platinum or palladium, are able to hydrogenate food oils at relatively low temperatures, e.g., room temperature, but they generally are not very selective. As a consequence of unselective hydrogenation, a hardened fat that is solid at room temperature often will be achieved before C18:3 content of canola oil or soybean oil, for example, is reduced to two percent. Consequently, such catalysts are unsuitable for producing a commercial pourable frying oil that is semi-liquid at room temperature.

Nickel-based catalysts are more selective, tending to hydrogenate trienic fatty acids at a higher rate than dienic or monoenic fatty acids. Most commercially available nickel-based hydrogenation catalysts comprise nickel on a relatively inert carrier, such as silica or alumina. The properties of nickel-based catalysts may be adjusted by additions of minor amounts of other metals, such as copper or even minor amounts of platinum or palladium. Commercially available nickel-based catalysts used in hydrogenating food oils, for example, are typically sold with the nickel-based catalysts distributed in a fully hardened fat matrix.

Nickel-based catalysts on inert carriers can be more selective than platinum and palladium, for example, but typically require either high temperatures or electrolysis to drive the hydrogenation reaction. In the absence of electrolysis, nickel-based catalysts typically require temperatures of 100° C. or more to conduct hydrogenation at an acceptable rate, with commercial hydrogenation processes being conducted at 120° C. or higher. Conducting hydrogenation at such high temperatures, however, tends to increase the formation of trans-fatty acids. For example, commercially available hydrogenated semi-liquid frying oils based on canola or soybean oil and having C18:3 levels of 2% or less will typically have at least 15% of the fatty acids in the trans form, with trans-fatty acid contents of 20% or higher being commonplace.

Electrolytic hydrogenation using nickel catalysts can be conducted at relatively low temperatures, e.g., room temperature, but have limited use for commercial production of hydrogenated food oils. In electrolytic applications, the nickel catalyst is typically a monolithic block of nickel that can be electrically connected to a power source to serve as a cathode. An anode is spaced from the nickel cathode. Food oils tend to be fairly good dielectrics and significantly limit electrical conduction between the cathode and the anode. To render the food oils conductive, they typically must be emulsified in a conductive medium (e.g., saline solution or formic acid) or mixed with a solvent (e.g., alcohol or ketones). Adding and subsequently removing such conductive agents drives up the cost of the hydrogenation process and may render the resultant product less desirable as a food oil.

DETAILED DESCRIPTION

A. Overview

Figure 1:
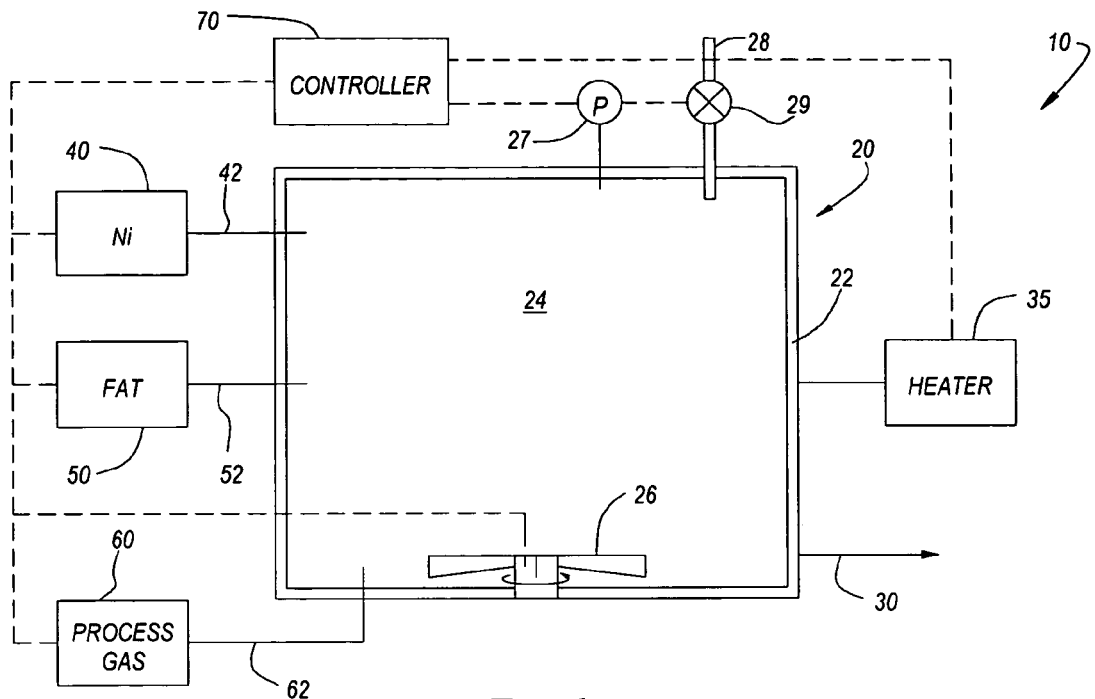
FIG. 1 is a schematic illustration of a catalyst activation system in accordance with one embodiment of the invention.

Various embodiments of the present invention provide methods for activating nickel-based hydrogenation catalysts; catalyst compositions including activated nickel-based hydrogenation catalysts; methods for hydrogenating an unsaturated feedstock, e.g., an edible oil; and edible hydrogenated fat compositions. The following text discusses aspects of the invention in connection with FIGS. 1 and 2 to provide a thorough understanding of particular embodiments. A person skilled in the art will understand, however, that the invention may have additional embodiments, or that the invention may be practiced without several of the details of the embodiments shown in FIGS. 1 and 2.

One embodiment of the invention provides a method for hydrogenating an unsaturated feedstock. In accordance with this method, an activated catalyst composition is produced by heating a nickel-based catalyst to a first temperature of at least about 100° C. in the presence of hydrogen and a fat component. The unsaturated feedstock may then be contacted with the previously treated activated catalyst composition and hydrogenated by sustaining a hydrogenation reaction at a second temperature of no greater than about 70° C. In this embodiment, the feedstock may comprise at least one polyunsaturated hydrocarbon.

Another embodiment of the invention provides a method of hydrogenating an oil having an initial Iodine Value and including an initial fatty acid content, with at least about four percent of the initial fatty acid content comprising C18:3. In accordance with this method, a nickel-based catalyst is dispersed in the oil and hydrogen is delivered to the oil. The oil is hydrogenated at a hydrogenation temperature no greater than about 70° C. for a hydrogenation time to yield a hydrogenated oil having a modified Iodine Value and including a modified fatty acid content. The hydrogenated oil in this embodiment is at least semi-liquid at 25° C. An absolute difference between the initial and modified Iodine Values divided by the hydrogenation time defines an average Iodine Value change rate of no less than about 5/hour. No more than about 2.5% of the modified fatty acid content comprises C18:3 and no more than about 6% of the modified fatty acid content comprises trans-fatty acids.

A substantially platinum-free hydrogenation catalyst composition in accordance with another embodiment of the invention includes a solid hydrogenated fat matrix and a nickel-based catalyst dispersed in the hydrogenated fat matrix. The nickel-based catalyst is adapted to sustain, in the presence of hydrogen, a hydrogenation reaction of a dielectric oil comprising polyunsaturated fatty acids at a temperature of no greater than about 50° C.

For ease of understanding, the following discussion is subdivided into three areas of emphasis. The first section discusses aspects of processes for activating hydrogenation catalysts and catalyst compositions including activated catalysts in accordance with selected embodiments of the invention. The second section outlines hydrogenation methods in accordance with other aspects of the invention. The third section discusses edible fat compositions in accordance with other embodiments of the invention.

B. Catalyst Activation and Catalyst Compositions

Select embodiments of the present invention provide activated catalyst compositions suitable for use in hydrogenation reactions and methods for producing such activated catalyst compositions. FIG. 1 schematically illustrates one possible catalyst activation system 10 useful for forming an activated catalyst composition in some embodiments of the invention. The catalyst activation system 10 includes a catalyst activation vessel 20 having walls 22 defining an interior 24. A nickel-based catalyst may be delivered to the vessel interior 24 from a catalyst supply 40 via a catalyst delivery line 42. A fat component may be delivered to the vessel interior 24 from a fat supply 50 via a delivery line 52. A process gas, e.g., hydrogen gas, may be delivered to the vessel interior 24 from a process gas supply 60 via a process gas delivery line 62.

An agitator 26 in the vessel interior 24 may enhance distribution of process gas and the nickel-based catalyst throughout the fat component during the activation process. The agitator 26 is schematically illustrated as a rotating set of paddles or blades, but those skilled in the art will recognize that any of a variety of systems may be used to distribute the process gas and the nickel-based catalyst throughout the fat component.

The catalyst reaction system 10 may also include a heater 35 operatively coupled to the catalyst activation vessel 20 to control the temperature of the material in the vessel interior 24. The same heater 35 or separate heaters (not shown) may also be coupled to one or more of the catalyst supply 40, fat supply 50, and process gas supply 60. The catalyst activation vessel 20 may also include a pressure control 27 adapted to monitor the pressure within the vessel interior 24 and control a vent valve 29 in a vent line 28 adapted to release excess process gas and other gases (e.g., water vapor generated during the activation process) from the vessel 20. A vessel outlet 30 may be used to remove the activated catalyst from the vessel interior 24. As noted below, the outlet 30 may communicate directly with a catalyst composition supply 140 in the hydrogenation system 100 of FIG. 2 (discussed below) or send the catalyst to a storage vessel (not shown) for later use.

The catalyst reaction system 10 also includes a controller 70 adapted to control aspects of the catalyst reaction system 10. The controller 70 may be operatively coupled to one or more of the agitator 26, pressure control 27, vent valve 29, heater 35, catalyst supply 40 or delivery line 42, fat supply 50 or delivery line 52, and process gas supply 60 or delivery line 62. In one embodiment, the controller 70 comprises at least one computer having a programmable processor programmed to control operation of these components to form an activated catalyst composition.

The nickel-based catalyst in the catalyst supply 40 may comprise any of a variety of conventional nickel-based catalysts. In one embodiment, the nickel-based catalyst comprises nickel carried on an inert support, e.g., alumina or silica. In some of these implementations, nickel may comprise about 25-75 weight percent, e.g., about 50-65 weight percent, of the nickel-based catalyst. Typically, at least some of the nickel will be present as NiO. In some embodiments, substantially all of the nickel is present as NiO, as in the case of nickel catalysts that have been calcined in air. In other embodiments, about 30-60% of the weight of the nickel is nickel metal and the balance of the weight of the nickel is contained in NiO.

In some embodiments, substantially all of the metal carried on the inert support may comprise nickel. In other embodiments, minor amounts of copper or other metals may be added to control activity, selectivity, or other properties of the catalyst. In select implementations, the nickel-based catalyst may be at least substantially free of platinum, palladium, or ruthenium. Nickel catalysts on inert supports expected to suffice for this purpose are commercially available from Degussa AG of Frankfurt, Germany, among others.

The fat component in the fat supply 50 may be any of a variety of fat compositions. Although the fat in the fat supply 50 may be substantially saturated, many of the embodiments of the invention will employ an unsaturated fat. As noted below, some embodiments of the invention employ catalyst compositions having relatively low melting points. In such embodiments, the melting point of the catalyst composition produced in the catalyst activation system 10 may depend in large part on the composition of the fat in the fat supply 50.

Figure 2:
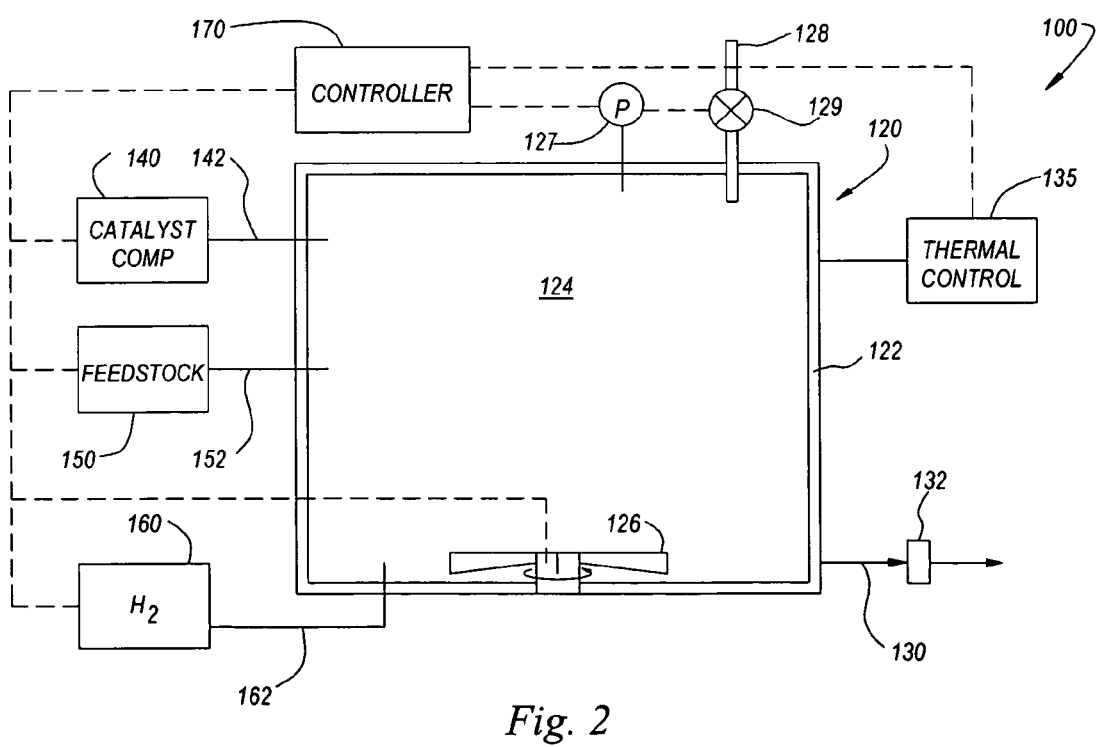
FIG. 2 is a schematic illustration of a hydrogenation system in accordance with another embodiment of the invention.

The fat in the fat supply 50 may comprise seed oil or vegetable oil or a blend of seed oil(s) and/or vegetable oil(s). Catalyst compositions with relatively low melting points, for example, may be formed using coconut oil in the fat supply 50. In other embodiments, the oil selected for the fat supply 50 may be the same type of oil that is to be hydrogenated in the hydrogenation system 100 (FIG. 2, discussed below). Hence, if the catalyst composition produced in the catalyst activation system 10 is to be used to hydrogenate soybean oil, the fat supply 50 may contain or consist essentially of soybean oil. This avoids the contamination that results from using a fat in the catalyst composition different from the oil being hydrogenated with the catalyst composition.

In the embodiment shown in FIG. 1, there is a separate catalyst supply 40 and fat supply 50. In such an embodiment, the nickel-based catalyst in the catalyst supply 40 may comprise both a nickel-based catalyst as described above and a fat, e.g., a fully hardened seed oil or vegetable oil. Such nickel-based catalyst formulations are commercially available from a variety of sources, including products sold by Johnson Matthey Plc of London, UK under the trade name PRICAT. If the catalyst supply 40 includes sufficient fat to form the desired catalyst composition, the separate fat supply 50 may be omitted, essentially combining the catalyst supply 40 and the fat supply 50 into a single supply. In other embodiments, the fat supply 50 may provide a source of additional fat and both the fat-containing catalyst formulation in the catalyst supply 40 and additional fat from the fat supply 50 may be delivered to the catalyst activation vessel 20.

If so desired, the gas in the process gas supply 60 may be substantially nitrogen-free and may consist essentially of hydrogen (e.g., commercial grade, as opposed to laboratory grade, hydrogen). In another embodiment of the invention, though, the process gas supply 60 includes a gas, e.g., a reducing gas, other than or in addition to hydrogen. For example, the process gas supply 60 may include a supply of hydrogen gas and a separately controllable supply of nitrogen, ammonia (not shown), or other nitrogen-containing gas. In another possible embodiment, the gas in the process gas supply 60 may be a gas other than hydrogen and need not be a reducing gas, e.g., the gas may consist essentially of nitrogen and/or ammonia. In select embodiments, the gas may comprise a mixture of two or more of hydrogen gas, nitrogen gas, ammonia, and helium gas.

The catalyst activation system 10 schematically illustrated in FIG. 1 is a batch-type system. It is contemplated, though, that catalyst activation systems in accordance with other embodiments of the invention may activate catalyst compositions on a continuous basis.

Some embodiments of the invention provide methods for producing an activated catalyst composition. In the following discussion, reference is made to the catalyst activation system 10 shown schematically in FIG. 1. It should be understood, though, that reference to this particular system is solely for purposes of illustration and that the activation methods outlined below are not limited to the particular system shown in FIG. 1 or discussed above.

A method in accordance with one embodiment produces an activated catalyst composition by contacting a fat component with a nickel-based catalyst in the presence of a process gas at an activation temperature. The fat component may comprise oil or other fat delivered to the vessel interior 24 from the fat supply 50 via delivery line 52. In one embodiment, the fat may be delivered to the vessel interior 24 and heated to the activation temperature by the heater 35 in the vessel interior 24 before the nickel-based catalyst is added. In other embodiments, the fat component may be pre-heated before it is delivered to the vessel interior 24 and the heater 35 may simply be used to maintain the reactants in the vessel interior 24 at the desired reaction temperature.

The controller 70 may monitor and control the pressure in the vessel interior 24 via the pressure controller 28. In one embodiment, the pressure in the vessel interior is sub-atmospheric or higher, e.g., 1-25 bar with pressures of at least two bar being useful in some configurations. In some embodiments, the pressure in the vessel interior 24 may vary depending on the state of the process. For example, the pressure in the vessel interior 24 may be maintained below atmospheric pressure for a period of time after the fat is introduced to the vessel interior 24 to outgas air and other dissolved gases in the fat. Alternatively, or in addition to such sub-atmospheric outgassing, the fat may be purged, e.g., with nitrogen, to remove oxygen from the fat.

The nickel-based catalyst may be delivered to the vessel interior 24 via the catalyst delivery line 42. In one embodiment, the nickel-based catalyst is added to a quantity of fat component in the vessel 20 when the fat component is at the desired activation temperature. In other embodiments, the nickel-based catalyst may be added prior to reaching that temperature. The agitator 26 may intermix the nickel-based catalyst with the fat component, effectively distributing the nickel-based catalyst within the fat component.

The heater 35 may be used to maintain the temperature of the reactants in the vessel interior 24 at the desired activation temperature. If the fat in the fat supply 50 is unsaturated, contact with the nickel-based catalyst in the presence of hydrogen, for example, from the process gas supply 60 will cause an exothermic hydrogenation reaction. As a result, the reaction may proceed with no additional heat from the heater 35 and the temperature may climb during this hydrogenation process. The activation temperature is desirably at least about 100° C. It is anticipated that the reaction rate may be substantially higher at higher temperatures, which may be at least about 150°, e.g., at least about 200° C. In one exemplary embodiment, the activation temperature is about 150-200° C. The length of time during which the fat is exposed to hydrogen at the activation temperature would depend, in part, on the activation temperature. For example, the activation process may continue for five minutes or longer, e.g., 5-120 minutes, with longer times typically being employed at lower activation temperatures.

After heating, the reactants in the vessel interior 24 may be cooled to a lower temperature. For example, the reactants may be cooled to room temperature, e.g., 20-25° C., for storage and future use or, if the reactants are to be directly added to a hydrogenation vessel (124 in FIG. 2), to an intermediate temperature, e.g., 120° C. It appears that cooling these reactants in a reducing atmosphere (e.g., a hydrogen atmosphere) or a nitrogen atmosphere can significantly improve the hydrogenation activity of the activated catalyst composition. In select embodiments of the invention, the cooling is conducted under a superatmospheric hydrogen pressure, e.g., two bar. It is anticipated that higher hydrogen pressures during cooling may further enhance the hydrogenation activity of the catalyst composition. In one particular embodiment, the reactants are cooled to an intermediate temperature close to room temperature, e.g., 35° C., under a hydrogen atmosphere, then allowed to cool from the intermediate temperature to room temperature in another atmosphere, e.g., air. In one embodiment, the intermediate temperature is less than the melting point of the fat in the catalyst composition.

The activation process may generate water vapor. This water vapor can be removed from the vessel 20, e.g., by venting the headspace through vent line 28 or via a condensation system (not shown).

Aspects of select catalyst activation processes in accordance with the invention are illustrated in the following examples:

CATALYST ACTIVATION EXAMPLE 1

A first exemplary catalyst composition was formed by adding 40 g of PRICAT 9920 to a round-bottom 250 ml flask. The PRICAT 9920, which is commercially available from Johnson Matthey Plc, is nominally about 22 weight percent total nickel on an alumina support coated with a hardened vegetable fat as a protective medium. The hardened vegetable fat has a melting point (as measured under ISO 6321, "Melting Point in Open Capillary Tubes (Slip Point)") of about 56-69° C. The catalyst composition was heated in the flask at atmospheric pressure with a hydrogen gas flow of approximately one liter per minute to a temperature of about 200° C. while stirring. The catalyst composition was stirred at that temperature and hydrogen flow rate for about 90 minutes. The hydrogen pressure was increased to about two bar and the hydrogen flow was stopped. The catalyst composition was cooled to about 20° C., yielding a solid catalyst composition.

CATALYST ACTIVATION EXAMPLE 2

A second exemplary catalyst composition was formed using substantially the same process as that outlined in Catalyst Activation Example 1, except that about 40 g of coconut oil was added to the flask with the 40 g sample of PRICAT 9920. The resultant activated catalyst composition was solid at 20° C. and the fat in the catalyst composition had a melting point of about 50° C.

CATALYST ACTIVATION EXAMPLE 3

A third exemplary catalyst composition was prepared by flowing nitrogen (instead of hydrogen) through a bulk quantity of PRICAT 9920 to a pressure of about 2 bar. The temperature was held at about 110° C. for about 120 minutes, with the nitrogen atmosphere in the reaction vessel being maintained by periodically flushing the headspace of the reaction vessel with nitrogen.

Once the activation process is complete, the activated catalyst composition may be removed from the vessel 20, e.g., via outlet 30. In one embodiment, the activated catalyst composition may be delivered directly from the vessel 20 to the catalyst composition supply 140 of the hydrogenation system 100, discussed below. In such an embodiment, the activated catalyst composition may be delivered to the hydrogenation system 100 at an elevated temperature, e.g., at the activation temperature or, more generally, about 100-200° C. In other embodiments, the activated catalyst composition may be allowed to cool in a separate system to a lower temperature, e.g., 20-25° C., and stored for an extended period of time. Maintaining a hydrogen atmosphere (or an atmosphere of another reducing gas) during cooling may permit longer storage times without undue loss in activity. Cooling the activated catalyst composition in a nitrogen or air atmosphere is expected to work well, though.

It has been found, for example, that the low temperature-hydrogenation capabilities of the activated catalyst composition of some embodiments can be maintained after storage at 20-25° C. for two weeks or longer. It is anticipated that this relatively long activated shelf life will enable activated catalyst compositions in accordance with embodiments of the invention to be sold commercially to third parties for use in hydrogenation reactions. The activated catalyst composition may be stored as a relatively large block or may be divided into smaller particles to facilitate distribution of the activated catalyst composition in the feedstock to be hydrogenated.

Other embodiments of the invention provide activated catalyst compositions. In certain embodiments, the activated catalyst compositions are prepared in accordance with the activation processes outlined above. In an embodiment of the invention, the activated catalyst composition is adapted to hydrogenate an unsaturated fatty acid component of a seed oil or vegetable oil, for example, at a temperature below that conventionally understood to be necessary for commercial hydrogenation. Although the catalyst composition may comprise only the nickel-based catalyst, activated catalyst compositions in accordance with preferred embodiments of the invention include a nickel-based catalyst dispersed in a fat matrix. The fat matrix may comprise a substantially saturated fat, e.g., a hydrogenated fat produced using a seed oil or vegetable oil as the fat component in the activation processes outlined above.

The nickel-based catalyst in the activated catalyst composition is adapted to sustain, in the presence of hydrogen, a hydrogenation reaction of a composition containing polyunsaturated fatty acids at a hydrogenation temperature no greater than about 70° C., preferably 50° C. or less. In select embodiments, the nickel-based catalyst is adapted to sustain such hydrogenation at a hydrogenation temperature of about 20-50° C., e.g., about 30-50° C.

The relative proportions of the nickel-based catalyst and the fat component may vary significantly depending on such factors as the nickel content of the nickel-based catalyst and the desired total nickel content of the activated catalyst composition. In one embodiment, the total nickel content of the activated catalyst composition is no greater than about 25 weight percent and may advantageously be 22 weight percent of the catalyst composition. (As used herein, the term "total nickel content" refers to the total weight of nickel in the nickel-based catalyst or the catalyst composition. For example, if some of the nickel in the nickel-based catalyst were present as NiO, the total nickel content would include the weight of the nickel in the NiO, as well.) Catalyst compositions having total nickel contents as low as about one weight percent may be employed in some circumstances. Preferably, though, the total nickel content in the catalyst composition is higher than that. Hence, in one embodiment, the total nickel content is about 2-50 weight percent, e.g., between about 2 and about 35 weight percent, with a range of about 2-25 weight percent being useful for many embodiments.

The preceding discussion focuses on catalyst compositions comprising nickel-based catalysts. The industry-proven selectivity of many nickel-based catalysts is believed to be particularly useful in connection with certain types of feedstocks. It is anticipated, though, that the processes outlined above may enhance the catalytic activity of other hydrogenation catalysts. For example, it is anticipated that the catalytic activity of platinum in hydrogenation reactions may be increased using aspects of the process outlined above. This may enable hydrogenation using lower concentrations of the catalyst, at lower temperatures, or at higher rates than may otherwise be achieved.

Activated catalyst compositions in accordance with embodiments of the invention can be used advantageously in a variety of hydrogenation reactions. For example, activated catalyst compositions in accordance with aspects of the invention have particular utility in hydrogenation of seed oils and vegetable oils. As explained below, these activated catalyst compositions can hydrogenate such oils at temperatures lower than conventionally understood to be necessary for hydrogenation at commercially acceptable rates, which can limit formation of trans-fatty acids.

C. Methods for Hydrogenating Edible Oils

Other embodiments of the invention provide systems and methods for hydrogenating unsaturated feedstocks at reduced temperatures. FIG. 2 schematically illustrates a hydrogenation system 100 that may be used in hydrogenating a feedstock in accordance with certain embodiments of the invention. This hydrogenation system 100 includes a hydrogenation vessel 120 including a wall 122 defining a hydrogenation vessel interior 124. A pressure control 127 may be used to monitor pressure within the hydrogenation vessel 120 and control a vent valve 129 in a vent line 128 adapted to release excess hydrogen gas, water vapor, and other gases from the vessel 120. An agitator 126, which may be directly analogous to the agitator 26 of FIG. 1 described above, may be disposed in the hydrogenation vessel interior 124 to mix the reactants within the vessel 120.

The hydrogenated product may be removed from the hydrogenation vessel 120 via an outlet 130. In the catalyst activation system 10 of FIG. 1, the nickel-based catalyst was intended to remain within the catalyst composition exiting the activation vessel 20 via the outlet 30. In most intended applications of the hydrogenated product, it may be desirable to remove the nickel-based catalyst from the final hydrogenated product. As is known in the art, a filter 132 may be used to remove the nickel-based catalyst from the hydrogenated product exiting via the outlet 130. In some embodiments, the nickel-based catalyst removed by the filter 132 may be reused, either directly or after further processing. Such further processing may comprise, for example, repeating the activation process outlined above to reactivate the nickel-based catalyst.

The hydrogenation system 100 also includes a thermal control 135 that may be operatively coupled to the hydrogenation vessel 120. In one embodiment, the thermal control 135 comprises a heat source, e.g., a radiative or conductive heater. In other embodiments, the thermal control 135 may instead be used to cool the contents of the hydrogenation vessel 120, e.g., to prevent the contents of the hydrogenation vessel 120 from exceeding a maximum desired temperature during the exothermic hydrogenation reaction conducted in the vessel 120.

A controller 170 may be used to control operation of the hydrogenation system 100. The controller 170 may be operatively coupled to one or more of the agitator 126, pressure control 127, vent valve 129, thermal control 135, catalyst composition supply 140 (discussed below), feedstock supply 150 (discussed below), and hydrogen supply 160 (also discussed below). The controller 170, like the controller 70 of FIG. 1, may comprise at least one computer having a programmable processor. The programmable processor may be programmed to control operation of the various components of the hydrogenation system 100 to appropriately hydrogenate the feedstock.

A catalyst composition may be delivered from a catalyst composition supply 140 to the hydrogenation vessel interior 124 via a delivery line 142. The catalyst composition in the catalyst composition supply 140 desirably comprises an activated nickel-based catalyst composition capable of sustaining a hydrogenation reaction at a suitably low hydrogenation temperature. In many embodiments of the invention, the catalyst composition may comprise an activated catalyst composition such as that described above, including a nickel-based catalyst and a fat.

An unsaturated feedstock may be delivered to the interior 124 of the hydrogenation vessel 120 via a delivery line 152 from a feedstock supply 150. A wide variety of unsaturated feedstocks may be employed to yield different hydrogenated products. For example, the feedstock may comprise a petroleum fraction that may be hydrogenated to produce a medicinal white oil or medicinal paraffin. The hydrogenation system 100 and the activated catalyst composition in the supply 140, however, have particular utility in connection with hydrogenating seed oils, vegetable oils, and marine oils (e.g., fish oils). Suitable seed oils and vegetable oils include, but are not limited to, soybean oil, canola oil, palm oil, coconut oil, corn oil, high oleic sunflower oil, linseed oil, palmolein oil and cottonseed oil. If so desired, the feedstock can be a blend of seed oil(s), vegetable oil(s), and/or marine oil(s). In select embodiments, the feedstock comprises a neutralized, bleached seed or vegetable oil, though some applications may used deodorized oils.

In one embodiment, the feedstock comprises at least one unsaturated organic component, e.g., an unsaturated (e.g., polyunsaturated) fatty acid or an unsaturated (e.g., polyunsaturated) hydrocarbon. For example, a feedstock comprising soybean oil or canola oil typically would include C18:2 and C18:3 fatty acids.

The hydrogenation system 100 also includes a hydrogen supply 160 adapted to deliver hydrogen to the reactants in the hydrogenation vessel 120 via a delivery line 162. In one embodiment, the hydrogen supply 160 comprises hydrogen gas, e.g., a commercial hydrogen gas consisting essentially of hydrogen. In other embodiments, the hydrogen supply 160 may include gases other than hydrogen. These other gases may be provided in a separate gas supply (not shown). As in the case of the process gas supply 60 of FIG. 1, discussed above, the hydrogen supply 160 may, for example, include a separate supply of ammonia or other nitrogen-containing compound, which may enhance selectivity of the hydrogenation reaction. If an edible food oil is to be produced in the hydrogenation system 100, though, it may be advantageous to omit use of ammonia or other nitrogen-containing compounds.

FIG. 2 schematically illustrates a batch-type hydrogenation system 100. In other embodiments of the invention, an alternative hydrogenation system may be employed to hydrogenate any feedstock on a continuous basis. For example, a nickel-based catalyst may be activated in a fixed or fluidized bed and the feedstock may be passed through this bed of activated catalyst.

Other embodiments of the invention provide methods of hydrogenating an unsaturated feedstock. The following discussion of such methods refers to the hydrogenation system 100 of FIG. 2. It should be recognized, however, that methods in accordance with the invention may be conducted using any suitable equipment and the invention is not limited to the specific apparatus shown in FIGS. 1 and 2 and discussed above.

In accordance with an embodiment of the invention, an unsaturated feedstock is contacted with a nickel-based catalyst in the presence of hydrogen. As noted above, the feedstock may comprise a variety of different materials, but in many embodiments of the invention the feedstock may comprise oil containing polyunsaturated fatty acids, e.g., seed oils or vegetable oils. The relative proportions of the feedstock and the catalyst composition added to the hydrogenation vessel 120 will depend, at least in part, on the nickel content of the catalyst composition. In one embodiment, the total nickel content of the combined catalyst composition and feedstock is no greater than 1 weight percent, e.g., 0.05-1 weight percent. In one embodiment found to work well, the total nickel content is about 0.1-0.3 weight percent of the combined catalyst composition and feedstock. The nickel-based catalyst may be dispersed within the feedstock, e.g., by activating the agitator 126. Although it may be possible to utilize catalysts in addition to the nickel-based catalyst from the activated catalyst composition, it is anticipated that, in most embodiments, the activated catalyst composition will be substantially the only catalyst source during the hydrogenation of the feedstock.

As noted above, the activated catalyst composition may comprise a nickel-based catalyst dispersed in a fat matrix, e.g., a fully saturated fat component. If the catalyst composition is at a temperature below the melting point of the fat matrix, the fat matrix will limit interaction between the nickel-based catalyst and the feedstock in the hydrogenation vessel 120. If the catalyst composition is employed above its melting point, though, the melted fat matrix may be mixed with the bulk of the feedstock, allowing the nickel-based catalyst to intimately mix with the feedstock. Accordingly, in one embodiment of the invention, the fat component of the catalyst composition has a melting point that is no higher than the temperature at which hydrogenation is to be conducted in the hydrogenation vessel 120, e.g., no higher than about 50° C. This melting point may be determined in accordance with ISO 6321, mentioned above.

In other embodiments, it may be less desirable or less practical to employ a catalyst composition in which the fat component has a melting point lower than the intended hydrogenation temperature. To ensure adequate commingling of the nickel-based catalyst and the feedstock, it is preferable that such a catalyst composition be heated to a temperature at least as great as its melting point. This may be advantageously done prior to mixing the catalyst composition with the feedstock. Hence, in one embodiment the catalyst composition may be delivered from the catalyst composition supply 140 to the hydrogenation vessel 120 at a temperature greater than the intended hydrogenation temperature. In such an embodiment, the catalyst composition supply 140 and/or delivery line 142 may include a heater to elevate the temperature of the catalyst composition above the melting point of the fat component. This heated catalyst composition may then be added to a supply of the feedstock in the hydrogenation vessel 120. The feedstock in the hydrogenation vessel 120 may be at a temperature below the intended hydrogenation temperature and the addition of the warmer catalyst composition can elevate the combined temperature to the intended hydrogenation temperature. If further heating is needed to begin the hydrogenation process, the thermal control 135 may heat the contents of the hydrogenation vessel 120.

Alternatively, the catalyst composition may be heated in the hydrogenation vessel 120 to a temperature at least as great as its melting point prior to the addition of the feedstock. In one particular embodiment, the nickel-based catalyst may be activated in the same reaction vessel that is used to carry out the hydrogenation reaction. Hence, in the context of FIGS. 1 and 2, the feedstock supply 150 and the filter 132 may be added to the catalyst activation system 10 and the feedstock may be added to the catalyst activation vessel 20 upon completion of the catalyst activation process. The activated catalyst composition may be at a temperature substantially higher than the intended hydrogenation temperature, but addition of the feedstock at a temperature below the intended hydrogenation temperature will cool the activated catalyst composition.

In one embodiment, hydrogen is introduced to the feedstock in the hydrogenation vessel 120 before addition of the activated catalyst composition. For example, a batch of the feedstock to be hydrogenated may be added to the hydrogenation vessel 120, the pressure control 128 may reduce pressure in the hydrogenation vessel 120, and a flow of hydrogen from the hydrogen supply 160 may be initiated. This will help to de-aerate the feedstock and create a reducing environment in the reaction vessel before the activated catalyst composition is added to the reaction vessel. De-aerating and introducing hydrogen in this fashion is anticipated to maintain higher hydrogenation activity in the nickel-based catalyst and limit trans-fatty acid formation. This may also help limit the impact of some impurities in the feedstock, some of which (e.g., sulfur) are expected to have a negative impact on the continued catalytic activity of the nickel-based catalyst over time.

During hydrogenation, the pressure control 128 may be used to control the pressure in the hydrogenation vessel 120. As is known in the art, maintaining superatmospheric pressures in the hydrogenation vessel 120 can increase solubility of the hydrogen in an oil feedstock, facilitating hydrogenation. Appropriate pressures may depend, at least in part, on the nature of the feedstock. When hydrogenating food oils, for example, the pressure in the hydrogenation vessel 120 likely will remain less than 100 bars absolute (bar-a), e.g., 50 bar-a or less. In one embodiment, the pressure in the hydrogenation vessel 120 during hydrogenation is about 1-30 bar-a.

A solvent may be added to reduce viscosity of the feedstock, promoting effective introduction and transport of hydrogen-containing gas. That is not believed to be necessary for hydrogenating most seed oils, vegetable oils, or marine oils, though, and may be disadvantageous when producing an edible oil for food applications. In one embodiment, therefore, the feedstock is a seed oil, vegetable oil, or marine oil and the hydrogenation process is conducted substantially solvent-free.

Suitable hydrogenation temperatures will depend in large part on the nature of the feedstock being hydrogenated. In one embodiment, however, the hydrogenation temperature is no greater than about 70° C., with temperatures of 50° C. or less being advantageous for hydrogenating seed oils, vegetable oils, or marine oils to produce a food oil with a low trans-fatty acid content. In one embodiment, the hydrogenation temperature is about 20-50° C., with a range of 30-50° C. being suitable for many food oils.

As noted above, hydrogenation is an exothermic reaction. In some embodiments, the hydrogenation is initiated and sustained for a time at a hydrogenation temperature in one of the stated temperature ranges, but may increase beyond that range during hydrogenation. For example, the hydrogenation reaction may be initiated at a temperature not greater than about 50° C. and the temperature may be allowed to increase, e.g., about 10-30° C., during the course of the hydrogenation reaction. If so desired, the hydrogenation temperature is maintained within one of the above-stated temperature ranges (e.g., no greater than about 70° C.) during the entire hydrogenation process. This may be accomplished, for example, by controlling the flow rate of hydrogen from the hydrogen supply 160 or by cooling the vessel with the thermal control 135.

One measure for characterizing an average number of double bonds present in the triglycerides of an oil is the Iodine Value, which is typically determined by the Wijs method (A.O.C.S. Method Cd 1-25). For example, soybean oil typically has an Iodine Value of about 125-135 and canola oil typically has an Iodine Value of about 97-108. Because hydrogenation saturates the double bonds in the triglycerides, a decrease in Iodine Value will serve as a reasonable proxy of a measurement of the degree of hydrogenation. As a corollary, therefore, the rate of change of the Iodine Value for an oil can serve as a proxy for the rate of hydrogenation.

The rate of hydrogenation, and the rate at which the Iodine Value changes, may decrease as the number of double bonds in the oil decreases. An average Iodine Value change rate may be determined by determining the absolute difference between the initial Iodine Value of the oil prior to hydrogenation and the modified Iodine Value of the hydrogenated oil, and dividing that difference by the hydrogenation time. Average Iodine Value change rates of less than about 5/hour correspond to hydrogenation rates that are commercially unacceptable for most conventional food oils. Accordingly, in embodiments of the invention employed in manufacturing food oils, for example, the average Iodine Value change rate is desirably no less than about 5/hour. Average Iodine Value change rates of about 6-60/hour are expected to suffice for many commercial food oil hydrogenation processes, with average Iodine Value change rates of about 10-40/hour, e.g., about 20/hour, being typical for many embodiments of the invention.

D. Edible Hydrogenated Fat Compositions

Edible hydrogenated fat compositions in accordance with another embodiment may comprise partially hydrogenated oil, e.g., a partially hydrogenated seed oil, vegetable oil, or marine oil. In select embodiments, these edible fat compositions may be formed by the hydrogenation processes outlined above.

One of the purposes of hydrogenating an oil is to improve its stability, e.g., in air. Reducing the C18:3 content of oils that include C18:3, e.g., soybean oil or canola oil, can significantly improve stability. Some other oils, e.g., sunflower oil, have relatively little C18:3, but may include C18:2, another polyunsaturated fatty acid. A number of industry-accepted tests determine the oxidative stability of an oil by measuring the "induction period" on a RANCIMAT, sold commercially by Metrohm Ltd. of Herisau, Switzerland. One exemplary RANCIMAT test is ISO/DIS 6886.2. Refined soybean and canola oils typically have induction periods at 120° C. (referred to below as "R 120") on the order of about 3.5 hours, with refined sunflower oil having a somewhat shorter induction time of about three hours at the same temperature. Hydrogenating an oil in accordance with embodiments of the invention may significantly increase the induction period of the oil being hydrogenated. In some embodiments of the invention, for example, the hydrogenation process desirably at least doubles the induction period. In one suitable example, the induction period at 120° C. is about ten hours or more, which is more than double the standard 3-3.5 hour induction times for soybean, canola, and sunflower oils, for example.

Measuring the induction period, e.g., the R 120 induction period, of an oil is a direct measurement of at least one aspect of stability. It is possible to approximate the relative oxidation rate, and hence stability, of a edible oil. This approximation will not be very accurate because stability will depend on a variety of other factors, e.g., the presence of any naturally occurring or added antioxidants. As used herein, the relative oxidation rate of an oil may be calculated by multiplying the weight percent of each C18:y component times a weighting factor that is generally correlated to the relative oxidation rate of the particular component. More particularly, the relative oxidation rate (ROR) may be determined in accordance with the following formula:

$$ROR = (0.1 \times C18:1) + (1 \times C18:2) + (2 \times C18:3)$$

wherein C18:1 is the weight percentage of C18:1, C18:2 is the weight percentage of C18:2, and C18:3 is the weight percentage of C18:3. (These percentages are stated as percentages, i.e., the weight fraction times 100. For example, if the oil includes 60 weight percent C18:1, C18:1 in the formula would be 60, and the C18:1 would contribute 6 to the ROR.) A higher ROR value generally indicates a higher polyunsaturated fatty acid content and, concomitantly, reduced oil stability. Certain embodiments of the invention comprise an edible oil, e.g., soybean or canola oil, having an ROR value no greater than about 50, e.g., about 45 or less.

Conventional wisdom dictates that seed oils or vegetable oils such as soybean or canola oils must be hydrogenated at temperatures of 100° C. or higher to achieve commercially acceptable hydrogenation. Conventional wisdom also suggests that the lowest temperature at which a nickel-based catalyst will initiate hydrogenation is about 80° C. and that hydrogenation at 80° C. will take place at a commercially unattractive rate. As noted above, though, hydrogenating seed oils or vegetable oils at temperatures of 100° C. or greater will increase the trans-fatty acid content of the oil to relatively high levels, typically greater than 15% of the fatty acid, with 15-20% being commonplace for semi-liquid hydrogenated frying oils. Increasingly health-conscious consumers are looking for oils with lower trans content and some industry standards are expected to require trans-fatty acid contents for food oils of no greater than 5%.

Hydrogenating seed oils or vegetable oils with an activated catalyst composition in accordance with select embodiments of the invention yields partially hydrogenated oils with reduced trans-fatty acid levels. In one embodiment, the feedstock comprises an oil in which 6% or more of the fatty acid content is C18:3. For example, soybean oils typically have C18:3 contents on the order of about 7%, and canola oils often have C18:3 contents of 9% or higher. Hydrogenating such a feedstock with an activated catalyst composition at a reduced hydrogenation temperature in accordance with an embodiment of the invention, e.g., 50° C. or less, is anticipated to yield a pourable hydrogenated oil that is semi-liquid at typical storage temperatures of about 20° C. or 25° C. in which no more than about 2.5% (preferably no more than about 2%) of the fatty acid content is C18:3 and no more than about 10% (preferably no more than about 6%) of the fatty acid content is trans-fatty acids. In some advantageous embodiments of the invention, the edible fat composition comprises a pourable hydrogenated oil that is semi-liquid at about 20-25° C.

One known measure that indicates the ease with which an oil will pour at room temperature employs nuclear magnetic resonance to measure the solid fat content of the oil at a particular temperature. An oil in one exemplary embodiment is pourable at 25° C. and has a solid fat content measured at 10° C. (SFC 10) of no greater than about 20 weight percent and a solid fat content measured at 20° C. (SFC 20) of no greater than about 10 weight percent. Another embodiment provides an oil that is pourable at 20° C. and has an SFC 10 of no greater than about 15 weight percent and an SFC 20 of no greater than about 7.5 weight percent. Oils in accordance with other embodiments of the invention may be processed for use as a pumpable shortening or the like having a higher solid fat content than those stated above.

Some commercially available frying oils and shortenings have a trans-fatty acid content of less than 5 weight percent, with some having a trans-fatty acid content of 1 weight percent or less. These products are typically formed by blending and/or interesterification of a fully hydrogenated oil with an unhydrogenated oil. For example, a soybean/sunflower oil blend may be made by fully hydrogenating, i.e., substantially fully saturating all of the fatty acids in, a quantity of soybean oil and blending that with an unhydrogenated sunflower oil and, in some circumstances, an additional quantity of unhydrogenated soybean oil. The fully hydrogenated product will not include double bonds, so it will not include any trans isomers. Hence, the only trans-fatty acid content in such a blend typically would come from the unhydrogenated sunflower oil.

Although fully-hydrogenated+liquid ("FH+L") blends (namely, blends in which at least one of the blended fats is fully hydrogenated and at least one of the blended fats is at least semi-liquid) can have relatively low C18:3 and trans-fatty acid content, there are some drawbacks. For example, FH+L blends are tend to have relatively low stability at elevated temperatures, e.g., frying temperatures. Whereas a conventional partially hydrogenated soybean oil may have a R 120 induction period of about 8-12 hours, some blends have R 120 induction periods of 7 hours or less, e.g., 4 hours. Many commercial frying applications call for a frying oil with a minimum R 120 induction period of 8 hours or longer, limiting the market acceptance of most blends.

The ROR values for conventional FH+L blends and for blended liquid oils also tend to be higher than ROR values for partially hydrogenated, non-blended oils. The ROR value of any particular partially hydrogenated oil will depend to a large extent on the type of oil being hydrogenated. Initial review suggests that FH+L blends employing about 10 weight percent fully hardened soybean oil and the balance unhydrogenated sunflower and soybean oils, for example, will have ROR values on the order of 60 or more. As noted above, embodiments of the invention have appreciably lower ROR values, e.g., 50 or less, with values no greater than 40, e.g., about 25, being typical of certain embodiments.

Another drawback of conventional FH+L blends is that their solid fat contents do not vary very much with temperature. When manufacturing baked goods, for example, it may be desirable to have low solid fat content at about 35-40° C. to avoid a greasy mouth feel when eaten. Typical semi-liquid FH+L blends may include appreciable solid fats at 40° C., e.g., a FH+L blend with about 10 weight percent fully hydrogenated oil may have a SFC of about 7 weight percent. Embodiments of the present invention, however, may have an SFC 40 value that is about zero.

The ratio of unsaturated cis-C18:y fatty acids (i.e., C18:1, C18:2, and C18:3) to the corresponding trans-C18:y fatty acids in a partially hydrogenated oil is an indication of the trans-selectivity of the hydrogenation process. More particularly, a higher ratio of unsaturated cis-C18:y fatty acid content to trans-C18:y fatty acid content suggests a lower likelihood of trans isomerization of an adsorbed carbon-carbon double bond at the catalyst surface. Higher ratios of unsaturated cis-fatty acids to trans-fatty acids, therefore, are preferred in a wide variety of applications, e.g., in many edible oils.

As noted above, trans-fatty acids are generally deemed to impact cardiovascular health more deleteriously than saturated fats. The ratio of saturated C18 fatty acids to trans-fatty acids in a partially hydrogenated oil, therefore, can suggest the desirability of the oil from a health perspective. A higher ratio of C18 to trans-fatty acid can be considered more desirable, at least as long as the C18 content is not unduly high. A number of edible oils, e.g., soybean oil and canola oil, have C18 contents of 6 weight percent or less, e.g., about 4 weight percent or less, prior to hydrogenation. For example, one exemplary deodorized, bleached soybean oil has a C18 content of about 4 weight percent and one exemplary deodorized, bleached canola oil contains about two weight percent C18. Hydrogenation tends to increase C18 levels and conventional processes can yield C18 levels of 4-6 weight percent or higher for products having C18:3 content of about two weight percent. Trans-fatty acid content also increases during hydrogenation, though, and conventional processes yield at least about 15 weight percent trans-fatty acid. As a result, conventional partially hydrogenated oil typically has more trans-fatty acid than C18, yielding a ratio of C18 to trans-fatty acid less than one, most commonly 0.5 or less.

One useful embodiment of the invention provides a pourable, partially hydrogenated edible oil (e.g., soy or canola oil) that is semi-liquid at about 20-25° C.; has a C18:3 content of about 2.5 weight percent or less, e.g., no greater than about 2 weight percent; and includes no more than about 6 weight percent, e.g., no more than about 5 weight percent, of trans-fatty acids. This oil may also have a ratio of unsaturated cis-C18:y fatty acids to trans-C18:y fatty acids (abbreviated below as CFA:TFA) of at least about 10.0, with a ratio of about 12 or greater, e.g., about 15 or more, being desirable. One particular embodiment has a CFA:TFA ratio of at least about 16. Typically, conventional partially hydrogenated edible soybean and canola oils having similar rheology and C18:3 content will have CFA:TFA ratios of less than 10, with some being less than 3. As noted previously, FH+L blends tend to be less stable than partially hydrogenated oils. Very high CFA:TFA ratios are commonly associated with hardened blends, which typically have CFA:TFA ratios of at least about 100. Hence, in select embodiments the CFA:TFA ratio is no greater than about 50, e.g., about 25 or less.

Another embodiment of the invention provides a pourable, partially hydrogenated edible oil that is semi-liquid at about 20-25° C. and has a C18:3 content of about 2.5 weight percent or less, e.g., no greater than about 2 weight percent, and includes no more than about 6 weight percent, e.g., no more than about 5 weight percent, of trans-fatty acids. This oil also has a ratio of saturated C18 to trans-C18:y fatty acid (abbreviated below as C18:TFA) of greater than one, e.g., at least about 1.2. In some embodiments of the invention, the C18:TFA ratio is at least about 1.5, e.g., 2.0 or greater. Some particular embodiments have a C18:TFA ratio of 3 or higher. This is in contrast to conventionally hydrogenated soybean and canola oils, which typically have a CFA:TFA ratio of less than 0.5, with ratios on the order of about 0.3 or less being commonplace. For example, one conventionally hydrogenated soybean oil had a CFA:TFA ratio of about 0.25. The same ratio tends to be lower for conventional partially hydrogenated canola oils, with CFA:TFA ratios typically below 0.25; one such oil had a CFA:TFA ratio of about 0.17. Although other oils may be used, some particularly useful implementations of this embodiment comprise partially hydrogenated soybean oil, partially hydrogenated canola oil, or a partially hydrogenated blend of soybean and canola oils.

FH+L blends commonly have C18:TFA ratios of around 15-30. Such blends are generally considered less stable than partially hydrogenated oils. Hence, in select embodiments the C18:TFA ratio is no greater than about 5, with C18:TFA ratios of about 3 or less being useful for a number of applications.

In certain embodiments, a pourable, partially hydrogenated oil may include CFA:TFA and C18:TFA ratios in accordance with both of the preceding embodiments. As in the two preceding embodiments, this oil may also be semi-liquid at about 20-25° C. and have a C18:3 content of about 2.5 weight percent or less, e.g., no greater than about 2 weight percent, and include no more than about 6 weight percent, e.g., no more than about 5 weight percent, of trans-fatty acids.

The composition of partially hydrogenated oil will depend to a significant extent on the nature of the oil being hydrogenated. The following will summarize some exemplary embodiments of the invention using specific starting oils. In each of these particular embodiments, the partially hydrogenated oil is pourable and may be semi-liquid at about 20-25° C.

Soybean Oil: The partially hydrogenated oil in one exemplary embodiment of the invention comprises a partially hydrogenated soybean oil containing no more than about 2.5 weight percent, e.g., no more than about 2.0 weight percent, of C18:3 and no more than about 6 weight percent, preferably no more than about 5 weight percent, of trans-fatty acids. In one implementation of this embodiment, the CFA:TFA ratio is at least about 12, e.g., 14 or higher. In select implementations, this ratio is at least about 15. If so desired, the CFA:TFA ratio may also be no greater than about 50, e.g., about 25 or less. In another implementation, the C18:TFA ratio is at least about 1.2, e.g., at least about 1.5, with select embodiments having a C18:TFA ratio of 2.0 or greater, e.g., about 2.5 or greater. If so desired, the C18:TFA ratio may also be no greater than about 6, e.g., about 3 or less. Embodiments having a R 120 induction period of at least about 8 hours and/or a ROR value of about 40 or less may be particularly utile, e.g., as a frying oil.

Canola Oil: Another exemplary embodiment of the invention provides a partially hydrogenated canola oil containing no more than about 2.5 weight percent, e.g., no more than about 2.0 weight percent, of C18:3 and no more than about 6 weight percent, preferably no more than about 5 weight percent, of trans-fatty acids. In one implementation of this embodiment, the CFA:TFA ratio is at least about 6, e.g., 9 or higher. In select implementations, this ratio is at least about 10, with CFA:TFA ratios of 15 or higher deemed particularly useful. If so desired, the CFA:TFA ratio may also be no greater than about 50, e.g., about 25 or less. In another implementation, the C18:TFA ratio is at least about 1.2, e.g., at least about 1.5, with select embodiments having a C18:TFA ratio of 2.0 or greater, e.g., 3.0 or greater. If so desired, the C18:TFA ratio may also be no greater than about 6, e.g., about 3 or less. Embodiments having a R 120 induction period of at least about 10 hours and/or a ROR value of about 30 or less may be particularly utile, e.g., as a frying oil.

Sunflower Oil: Partially hydrogenated sunflower oil in accordance with some embodiments of the invention have fatty acid profiles that depend on whether the oil is a "conventional" or "high-oleic" variety. As used herein, a conventional sunflower oil has a C18:1 (oleic acid) content less than 77 weight percent prior to hydrogenation; high-oleic sunflower oil has a C18:1 content of at least about 77 weight percent prior to hydrogenation. Pourable partially hydrogenated oil made from conventional sunflower oil may have a CFA:TFA ratio of at least about 15, e.g., about 18 or higher, and a C18:TFA ratio of at least about 1.2, desirably at least about 1.5, e.g., about 2.0 or higher. If so desired, the CFA:TFA ratio may also be no greater than about 75, e.g., about 50 or less. Pourable partially hydrogenated oil made from high-oleic sunflower oil may have a CFA:TFA ratio of at least about 25, e.g., about 40 or higher, and a C18:TFA ratio of at least about 1.5, e.g., about 2.0 or higher, with C18:TFA ratios of at least about 3.0 being useful in many applications. If so desired, the C18:TFA ratio may also be no greater than about 6, e.g., about 7 or less. In one useful embodiment, a conventional sunflower oil (e.g., no more than about 60 weight percent oleic acid) has a R 120 induction period of at least about 8 hours and/or a ROR value of about 55 or less.

Palmolein: A partially hydrogenated, semi-liquid palmolein in other embodiments of the invention contain no more than about 7 weight percent, e.g., no more than about 5 weight percent, of C18:2 and no more than about 6 weight percent, preferably no more than about 5 weight percent, of trans-fatty acids. In one implementation, the CFA:TFA ratio is at least about 6, e.g., 9 or higher, with some palmolein products of the invention having a CFA:TFA ratio of about 12 or higher. If so desired, the CFA:TFA ratio may also be no greater than about 40, e.g., about 20 or less. The C18:TFA ratio of such a palmolein product may be greater than about 1.5, desirably at least about 2.0, e.g., about 2.5 or higher. If so desired, the C18:TFA ratio may also be no greater than about 6, e.g., about 3 or less. Embodiments having a R 120 induction period of at least about 8 hours and/or a ROR value of about 10 or less may be particularly utile, e.g., as a frying oil.

Corn Oil: Still another embodiment of the invention provides a partially hydrogenated corn oil containing no more than about 50 weight percent, e.g., about 45 weight percent or less, of C18:2 and no more than about 6 weight percent, preferably no more than about 5 weight percent, of trans-fatty acids. In one implementation of this embodiment, the CFA:TFA ratio is at least about 10, e.g., 15 or higher. In select implementations, this ratio is at least about 18, with CFA:TFA ratios of 20 or higher deemed particularly useful. If so desired, the CFA:TFA ratio may also be no greater than about 50, e.g., about 25 or less. In another implementation, the C18:TFA ratio is at least about 0.7, e.g., at least about 1.0, with select embodiments having a C18:TFA ratio of 1.5 or greater. If so desired, the CFA:TFA ratio may also be no greater than about 10, e.g., about 6 or less. Embodiments having a R 120 induction period of at least about 8 hours and/or a ROR value of about 50 or less may be particularly utile, e.g., as a frying oil.

The following examples illustrate aspects of select feedstock hydrogenation processes and edible hydrogenated fat compositions in the context of hydrogenating fully refined seed oils:

HYDROGENATION EXAMPLE A

Canola Oil

About 3500 g of refined canola oil was heated to about 40° C. in a 5-liter autoclave. The oil was flushed with hydrogen gas to help remove any air or oxygen dissolved in the oil. The first exemplary catalyst composition discussed above in Catalyst Activation Example 1 was heated to about 120° C. to melt the hardened vegetable fat. About 35 g of this heated catalyst composition was added and thoroughly mixed to the canola oil in the autoclave. While stirring with a hollow shaft agitator at a speed of about 1000 rpm, a flow of hydrogen gas through the oil was established and the pressure in the autoclave was increased to about 10-15 bar. The temperature was maintained at about 40° C. for about 160 minutes. Table A identifies aspects of the fatty acid profile of the oil prior to hydrogenation (T=0 min.) and after hydrogenation (T=160 min.)

TABLE A

| Component | wt. % at T = 0 min. | wt. % at T = 160 min. |
|---|---|---|
| C18 | 1.8 | 12.4 |
| C18:1 | 61.3 | 63.7 |
| (cis) | | 60.3 |
| (trans) | | 3.4 |
| C18:2 | 19.8 | 13.6 |
| (cis) | | 11.7 |
| (trans) | | 1.9 |
| C18:3 | 9.0 | 2.0 |
| (cis) | | 1.3 |
| (trans) | | 0.7 |
| Total trans-C18:y | 1.0 | 6.0 |

TABLE A-continued

| Component | wt. % at T = 0 min. | wt. % at T = 160 min. |
|---|---|---|
| fatty acids (TFA) | | |
| Total cis-C18:y fatty acids (CFA) | | 73.3 |
| CFA:TFA | | 12.2 |
| C18:TFA | | 2.1 |

The solid fat content of the hydrogenated oil was determined at 10° C. and at 20° C. by nuclear magnetic resonance. The SFC 10 was about 13 weight percent and the SFC 20 was about 6 weight percent.

This hydrogenation process yielded a semi-liquid hydrogenated canola oil that is pourable at room temperature and has a total C18:3 content of about 2 weight percent and a trans-fatty acid content of only about 6 weight percent. This is substantially less than half the typical 15-20 weight percent trans-fatty acid obtained in conventional hydrogenation processes carried out at 100° C. or more. The CFA:TFA ratio is over 12, suggesting a more selective hydrogenation process, and the C18:TFA ratio is over 2, suggesting that the oil may be more healthful than conventionally hydrogenated canola oil.

HYDROGENATION EXAMPLE B

Canola Oil

A second sample of the same refined canola oil was hydrogenated in a process directly analogous to the process outlined in the previous example. Instead of being hydrogenated at 40° C. for 160 minutes, though, this sample was hydrogenated at 30° C. for about 460 minutes while mixing with the agitator at a speed of about 1300 rpm. Table B identifies aspects of the fatty acid profile of the oil prior to and after hydrogenation.

TABLE B

| Component | wt. % at T = 0 min. | wt. % at T = 460 min. |
|---|---|---|
| C18 | 1.8 | 16.3 |
| C18:1 | 61.3 | 60.2 |
| (cis) | | 58.2 |
| (trans) | | 2.0 |
| C18:2 | 19.8 | 12.9 |
| (cis) | | 11.6 |
| (trans) | | 1.3 |
| C18:3 | 9.0 | 2.0 |
| (cis) | | 1.4 |
| (trans) | | 0.6 |
| Total trans-C18:y fatty acids | 1.0 | 3.9 |
| Total cis-C18:y fatty acids | | 71.2 |
| CFA:TFA | | 18.3 |
| C18:TFA | | 4.2 |

The SFC 10 was about 21 weight percent of the hydrogenated oil and the SFC 20 was about 11 weight percent of the oil. As with the preceding example, the resultant semi-liquid hydrogenated oil is pourable at room temperature, has a total C18:3 content of 2 weight percent, has a CFA:TFA ratio greater than 10 (actually, this ratio exceeds 18 in this example), and has a C18:TFA ratio of greater than 2.0 (over 4 in this case). In this second example, the trans-fatty acid content was only 3.9 percent. While this is superior to Hydrogenation Example A, the 460-minute hydrogenation time may prove unduly expensive for low-cost frying oils, margarines, bakery fats, or similar applications.

HYDROGENATION EXAMPLE C

Soybean Oil

Soybean oil was hydrogenated in a process directly analogous to the process outlined above for the canola oil of Hydrogenation Example A. Table C identifies aspects of the fatty acid profile of the soybean oil prior to hydrogenation and after hydrogenation at 100 minutes (instead of 160 minutes employed in Hydrogenation Example A).

TABLE C

| Component | wt. % at T = 0 min. | wt. % at T = 100 min. |
|---|---|---|
| C18 | 3.2 | 9.3 |
| C18:1 | 25.6 | 41.7 |
| (cis) | | 37.1 |
| (trans) | | 4.6 |
| C18:2 | 52.0 | 34.2 |
| (cis) | | 31.5 |
| (trans) | | 2.7 |
| C18:3 | 6.5 | 1.8 |
| (cis) | | 1.3 |
| (trans) | | 0.5 |
| Total trans-C18:y fatty acids | 0.9 | 7.8 |
| Total cis-C18:y fatty acids | | 69.9 |
| CFA:TFA | | 9.0 |
| C18:TFA | | 1.2 |

The hydrogenated soybean oil had an SFC 10 of about 11 weight percent and an SFC 20 of about 4 weight percent. With a C18:3 content of less than 2 weight percent, this pourable semi-liquid hydrogenated oil is expected to be stable for use as a frying oil, for example. Even so, this oil has a trans-fatty acid content of about 7.8 weight percent, less than half of the 15-20 weight percent typical for most conventional partially hydrogenated oils.

HYDROGENATION EXAMPLE D

Canola Oil

About 3500 g of the same refined canola oil employed in Hydrogenation Example A was heated to about 40° C. in a 5-liter autoclave and flushed with hydrogen gas as outlined above. Instead of using 35 g of the first exemplary catalyst composition at 120° C., though, about 70 g of the second exemplary catalyst composition (Catalyst Activation Example 2) was added as a solid at about 20° C. to the 40° C. oil and mixed with an agitator at about 1300 rpm. Hydrogen gas was flowed through the oil/catalyst combination and the pressure in the autoclave was increased to about 20-25 bar. The oil and catalyst was mixed at about 40° C. for about 133 minutes. Table D identifies aspects of the fatty acid profile of the canola oil prior to and after the hydrogenation.

TABLE D

| Component | wt. % at T = 0 min. | wt. % at T = 133 min. |
|---|---|---|
| C18 | 1.8 | 15.9 |
| C18:1 | 61.3 | 61.1 |
| (cis) | | 58.8 |

TABLE D-continued

| Component | wt. % at T = 0 min. | wt. % at T = 133 min. |
|---|---|---|
| (trans) | | 2.3 |
| C18:2 | 19.8 | 12.8 |
| (cis) | | 11.5 |
| (trans) | | 1.3 |
| C18:3 | 9.0 | 1.9 |
| (cis) | | 1.3 |
| (trans) | | 0.6 |
| Total trans-C18:y fatty acids | 1.0 | 4.2 |
| Total cis-C18:y fatty acids | | 71.6 |
| CFA:TFA | | 17.0 |
| C18:TFA | | 3.8 |

The hydrogenated canola oil had an SFC 10 of about 17 weight percent and an SFC 20 of about 8 weight percent. Hence, a pourable semi-liquid hydrogenated oil with a C18:3 content of under 2 weight percent was produced in a little over two hours with a trans-fatty acid content of only 4.2 weight percent and a ratio of cis-fatty acids to saturated and trans-fatty acids of about 2.52. Even though the total nickel content of the catalyst composition/oil in the autoclave was about the same as in Hydrogenation Example A (the total nickel content of the second catalyst composition is about half that of the first catalyst composition), a hydrogenated oil with a lower trans-fatty acid content was achieved in slightly less time.

HYDROGENATION EXAMPLE E

Canola Oil

A second sample of canola oil was hydrogenated in substantially the same manner as that outlined above in Hydrogenation Example D, except that only 56 g, instead of 70 g, of the second exemplary catalyst composition was added to the oil. Table E identifies aspects of the fatty acid profile of the oil prior to and after hydrogenation.

TABLE E

| Component | wt. % at T = 0 min. | wt. % at T = 131 min. |
|---|---|---|
| C18 | 1.8 | 9.6 |
| C18:1 | 61.3 | 64.7 |
| (cis) | | 61.2 |
| (trans) | | 3.5 |
| C18:2 | 19.8 | 15.1 |
| (cis) | | 13.2 |
| (trans) | | 1.9 |
| C18:3 | 9.0 | 2.2 |
| (cis) | | 1.4 |
| (trans) | | 0.8 |
| Total trans-C18:y fatty acids | 1.0 | 6.2 |
| Total cis-C18:y fatty acids | | 75.8 |
| CFA:TFA | | 12.2 |
| C18:TFA | | 1.6 |

The SFC 10 of the hydrogenated oil was about 8 weight percent and the SFC 20 was about 3 weight percent. Even with this reduced catalyst loading, a pourable semi-liquid hydrogenated canola oil with a C18:3 content of just over 2 weight percent was produced in a little over two hours with a trans-fatty acid content well under half that typically achieved using conventional hydrogenation processes. This particular oil also has a CFA:TFA ratio of in excess of 12, and a C18:TFA ratio of greater than 1.5.

HYDROGENATION EXAMPLE F

Canola Oil

About 10 g of the refined canola oil of the preceding examples was added to a 100-ml flask and about 0.4 g of the second exemplary catalyst composition was added to the flask. The flask was flushed with hydrogen gas. The hydrogen gas pressure was raised to about 1 bar-A, the temperature was increased to about 40° C., and the magnetic stirrer was rotated at about 600 rpm. A sample was removed from the flask about 66 minutes after the catalyst was first added to the flask. As identified in Table F, this test, which used more catalyst than the preceding examples, yielded a hydrogenated oil with a C18:3 content of only 1.4 weight percent and a trans-fatty acid content of 8 weight percent, less than half of that typical for conventional hydrogenated oils, in little over an hour.

TABLE F

| Component | wt. % at T = 0 min. | wt. % at T = 66 min. |
|---|---|---|
| C18 | 1.8 | 6.8 |
| C18:1 | 61.3 | 70.6 |
| (cis) | | 65.4 |
| (trans) | | 5.2 |
| C18:2 | 19.8 | 12.2 |
| (cis) | | 10.0 |
| (trans) | | 2.2 |
| C18:3 | 9.0 | 1.4 |
| (cis) | | 0.8 |
| (trans) | | 0.6 |
| Total trans-C18:y fatty acids | 1.0 | 8.0 |
| Total cis-C18:y fatty acids | | 76.2 |
| CFA:TFA | | 9.5 |
| C18:TFA | | 0.9 |

HYDROGENATION EXAMPLE G

Canola Oil

About 2700 g of the same refined canola oil identified above was added to a 5 liter autoclave, heated to 30° C., and flushed with hydrogen as identified above. About 30 g of the first exemplary catalyst composition mentioned above was mixed with about 300 g of the same refined canola oil in a separate container and heated under nitrogen to about 90° C. and mixed to disperse the catalyst in the additional canola oil. The resultant slurry was mixed with the 2700 g of canola oil in the autoclave. The temperature was maintained at about 30° C. with an agitator speed of about 1300 rpm for about 205 minutes at 10-15 bar. Table G lists aspects of the fatty acid profile of the canola oil prior to and after hydrogenation.

TABLE G

| Component | wt. % at T = 0 min. | wt. % at T = 205 min. |
|---|---|---|
| C18 | 1.8 | 15.4 |
| C18:1 | 61.3 | 60.5 |
| (cis) | | 58.6 |
| (trans) | | 1.9 |

TABLE G-continued

| Component | wt. % at T = 0 min. | wt. % at T = 205 min. |
|---|---|---|
| C18:2 | 19.8 | 13.0 |
| (cis) | | 11.6 |
| (trans) | | 1.4 |
| C18:3 | 9.0 | 1.8 |
| (cis) | | 1.2 |
| (trans) | | 0.6 |
| Total trans-C18:y fatty acids | 1.0 | 3.9 |
| Total cis-C18:y fatty acids | | 71.4 |
| CFA:TFA | | 18.3 |
| C18:TFA | | 4.0 |

The SFC 10 for the hydrogenated oil was about 16 weight percent and the SFC 20 measurement was about 8 weight percent. This resultant hydrogenated oil compares very favorably with conventionally hydrogenated canola oil, having a C18:3 content of only 1.8 percent and a remarkably low trans-fatty acid content of 3.9 weight percent with a hydrogenation time of a little over three hours. The CFA:TFA ratio is over 18, reflecting an advantageous hydrogenation process, and the C18:TFA ratio is about 4, also suggesting that the oil will appeal to more health-conscious consumers.

HYDROGENATION EXAMPLE H

Soybean Oil

About 15 metric tons of neutralized, bleached soybean oil was charged into a commercial hydrogenation reactor, heated to 50° C., and flushed with hydrogen. The third exemplary catalyst composition mentioned above was mixed with the soybean oil to form a slurry having about 9 kg of catalyst composition per metric ton of soybean oil. The slurry was hydrogenated for about 150 minutes at 6.5 bar. Table H lists aspects of the fatty acid profile of the soybean oil prior to and after hydrogenation.

TABLE H

| Component | wt. % at T = 0 min. | wt. % at T = 205 min. |
|---|---|---|
| C18 | 3.7 | 9.1 |
| C18:1 | 23.5 | 39.2 |
| (cis) | | 36.7 |
| (trans) | | 2.5 |
| C18:2 | 53.2 | 36.4 |
| (cis) | | 34.4 |
| (trans) | | 2.0 |
| C18:3 | 6.6 | 2.2 |
| (cis) | | 1.8 |
| (trans) | | 0.4 |
| Total trans-C18:y fatty acids | 1.0 | 4.9 |
| Total cis-C18:y fatty acids | | 72.9 |
| CFA:TFA | | 14.9 |
| C18:TFA | | 1.9 |

The resultant hydrogenated oil was pourable and semi-liquid at about 25° C. This oil compares very favorably with conventionally hydrogenated soybean oil, having a C18:3 content of only 2.2 percent and a trans-fatty acid content of only 4.9 weight percent with a hydrogenation time of about two-and-a-half hours. The CFA:TFA ratio is over 14, reflecting an advantageous hydrogenation process, and the C18:TFA ratio is almost two.

HYDROGENATION EXAMPLE I

Canola Oil

About 15 metric tons of refined canola oil was charged into the same commercial hydrogenation reactor used in Hydrogenation Example H. The canola oil was heated to about 45° C. and flushed with hydrogen. The canola oil and about 120 kg of the third exemplary catalyst composition mentioned previously were mixed and the resultant slurry was hydrogenated for about 50 minutes at a hydrogen gas flow rate of about 600 $NM^3$/hr and a pressure of about 20 bar. The temperature increased over the course of the hydrogenation process from about 45° C. to about 70° C. Aspects of the fatty acid profile of the resultant canola oil are listed in Table I:

TABLE I

| Component | wt. % at T = 50 min. |
|---|---|
| C18 | 10.7 |
| C18:1 | 66.8 |
| (cis) | 64.3 |
| (trans) | 2.5 |
| C18:2 | 12.6 |
| (cis) | 10.9 |
| (trans) | 1.7 |
| C18:3 | 2.0 |
| (cis) | 1.3 |
| (trans) | 0.7 |
| Total trans-C18:y fatty acids | 4.9 |
| Total cis-C18:y fatty acids | 76.5 |
| CFA:TFA | 15.6 |
| C18:TFA | 2.2 |

The partially hydrogenated canola oil was pourable and semi-liquid at about 25° C. This example demonstrates the viability of at least one embodiment of the invention to yield a quality oil (in this case, 2 weight percent C18:3, less than 5 weight percent trans-C18:y, a CFA:TFA ratio of over 15, and a C18:TFA ratio over 2) in very commercially attractive time frame. In this particular example, the Iodine Value of the oil changed by more than 30 over the course of the 50-minute hydrogenation, yielding an iodine value change rate of about 40/hr.

HYDROGENATION EXAMPLE J

Conventional Sunflower Oil

Each of two samples of refined sunflower oil was charged into an autoclave, heated to 40° C., and flushed with hydrogen. About 0.2 weight percent of commercial PRICAT 9920 was added in the first autoclave; about one weight percent of the third exemplary catalyst composition mentioned above was added to the other autoclave. The contents of the first autoclave were mixed to form a slurry and treated at about 120° C. in a fairly conventional hydrogenation process at about 180° C. for about five minutes at about one bar-a. The contents of the second autoclave were mixed to form a slurry and hydrogenated for about 100 minutes at a temperature of about 40-45° C. at about one bar-a. Table I lists aspects of the fatty acid profile of the initial refined sunflower oil prior to hydrogenation and that of the conventionally hydrogenated and the low-temperature hydrogenated oil.

TABLE J

| Component | wt. % at T = 0 min. | Conventional Hydrogenation | Low-Temperature Hydrogenation |
|---|---|---|---|
| C18 | 4.1 | 5.1 | 6.1 |
| C18:1 total | 27.9 | 45.9 | 34.5 |
| C18:2 total | 60.4 | 41.6 | 51.7 |
| C18:3 total | 0.1 | 0.0 | 0.0 |
| Total trans-C18:y fatty acids | 0.5 | 11.2 | 4.8 |
| Total cis-C18:y fatty acids |  | 76.3 | 81.4 |
| CFA:TFA |  | 6.8 | 17.0 |
| C18:TFA |  | 0.46 | 1.3 |

The resultant hydrogenated oil was pourable and semi-liquid at about 25° C. This data suggests that the low-temperature hydrogenated sunflower oil in accordance with an embodiment of the invention is superior to the conventionally hydrogenated sunflower oil, having a TFA content of less than half that of the conventional product. The CFA:TFA ratio of the conventionally hydrogenated sample is under eight and that of the low-temperature hydrogenated sample is more than twice as high at about 17.0. The conventional product's C18:TFA ratio is under 0.5 while that of the low-temperature hydrogenated sample, which has a C18:TFA ratio over 1.2.

HYDROGENATION EXAMPLE K

High-Oleic Sunflower Oil

Each of two samples of a refined, high-oleic sunflower oil was charged into an autoclave. One of the samples was hydrogenated in a conventional fashion and the other was hydrogenated at a lower temperature, both generally as described in Hydrogenation Example I. Table J lists aspects of the fatty acid profile of the initial refined, high-oleic sunflower oil and that of the conventionally hydrogenated and the low-temperature hydrogenated oils.

TABLE K

| Component | wt. % at T = 0 min. | Conventional Hydrogenation | Low-Temperature Hydrogenation |
|---|---|---|---|
| C18 | 3.5 | 4.1 | 6.7 |
| C18:1 total | 81.0 | 82.9 | 81.1 |
| C18:2 total | 10.1 | 7.0 | 7.1 |
| C18:3 total | 0.1 | 0.0 | 0.0 |
| Total trans-C18:y fatty acids | 0.1 | 4.4 | 2.0 |
| Total cis-C18:y fatty acids |  | 85.5 | 86.2 |
| CFA:TFA |  | 19.4 | 43.1 |
| C18:TFA |  | 0.93 | 3.4 |

The resultant hydrogenated oils were pourable and semi-liquid at about 25° C. This data suggests that the low-temperature hydrogenated oil is superior to the conventionally hydrogenated sunflower oil, having a TFA content of less than half that of the conventional product. The CFA:TFA ratio of the conventionally hydrogenated sample is under twenty and that of the low-temperature hydrogenated sample is more than twice that at 43.1. The conventional product's C18:TFA ratio is under 1.0 while that of the low-temperature hydrogenated sample has a C18:TFA ratio over 3.

HYDROGENATION EXAMPLE L

Palmolein

One sample of a refined palmolein was charged into an autoclaves and hydrogenated in a conventional fashion as outlined in Hydrogenation Example I. A second sample of the same refined palmolein was hydrogenated in a separate autoclave in a low-temperature hydrogenation process similar to that described in Hydrogenation Example I. Aspects of the initial palmolein and each of the partially hydrogenated products are listed in Table L:

TABLE L

| Component | wt. % at T = 0 min. | Conventional Hydrogenation | Low-Temperature Hydrogenation |
|---|---|---|---|
| C18 | 4.1 | 6.8 | 8.8 |
| C18:1 total | 41.9 | 51.4 | 43.0 |
| C18:2 total | 10.1 | 0.4 | 5.6 |
| C18:3 total | 0.2 | 0.0 | 0.0 |
| Total trans-C18:y fatty acids | 0.7 | 13.2 | 3.3 |
| Total cis-C18:y fatty acids |  | 38.6 | 45.3 |
| CFA:TFA |  | 2.9 | 13.7 |
| C18:TFA |  | 0.52 | 2.7 |

Although both of the partially hydrogenated palmolein samples were pourable and semi-liquid at about 25° C., the low-temperature hydrogenated sample had a much lower TFA content (3.3 wt. % vs. 13.2 wt. %) and much higher CFA:TFA ratio (13.7 vs. less than three) and C18:TFA ratio (2.7 vs. about 0.5). Hence, it appears that the low-temperature hydrogenation has better trans selectivity and yields a more healthful product than conventional hydrogenation.

HYDROGENATION EXAMPLE M

Corn Oil

Two samples of refined corn oil were treated as outlined in Hydrogenation Example I. Both the conventionally hydrogenated sample and the low-temperature hydrogenated sample were pourable and semi-liquid at about 25° C. Aspects of the initial corn oil and each of the two partially hydrogenated samples are listed in Table M:

TABLE M

| Component | wt. % at T = 0 min. | Conventional Hydrogenation | Low-Temperature Hydrogenation |
|---|---|---|---|
| C18 | 2.0 | 2.3 | 3.4 |
| C18:1 total | 30.9 | 41.6 | 37.4 |
| C18:2 total | 54.4 | 42.5 | 46.2 |
| C18:3 total | 1.0 | 0.6 | 0.8 |
| Total trans-C18:y fatty acids | 0.5 | 7.9 | 3.5 |
| Total cis-C18:y fatty acids |  | 76.8 | 80.9 |
| CFA:TFA |  | 9.7 | 23 |
| C18:TFA |  | 0.29 | 0.97 |

Again, the low-temperature hydrogenated sample was superior to the conventional product in several respects. First, the low-temperature sample had a TFA content less than half that of the conventional sample (3.5 wt. % vs. 7.9 wt. %).

Second, the low-temperature sample had a CFA:TFA ratio more than twice that of the conventional sample (23 vs. 9.7). Third, the C18:TFA ratio of the low-temperature sample was more than three times that of the conventional sample (0.97 vs. 0.29).

These examples suggest that aspects of the low-temperature hydrogenation processes outlined above can be used beneficially for a variety of products. In the context of edible fat products, for example, embodiments of the invention provide products that often have trans-fatty acid contents less than half, e.g., one third to one seventh, that of a more conventional process. In addition, the ratio of cis- to trans-C18:y acids in embodiments of the invention are often at least about double the same ratio for a more conventionally processed product. Both of these factors suggest that embodiments of the invention have a better trans selectivity than conventional processes. Further embodiments of the invention also yield partially hydrogenated edible fat products having a ratio of saturated C18 to trans-fatty acids at least about double, and commonly 3-5 times, that of analogous conventionally hydrogenated products.

The above-detailed embodiments and examples are intended to be illustrative, not exhaustive, and those skilled in the art will recognize that various equivalent modifications are possible within the scope of the invention. For example, whereas steps are presented in a given order, alternative embodiments may perform steps in a different order. The various embodiments described herein can be combined to provide further embodiments.

In general, the terms used in the following claims should not be construed to limit the invention to the specific embodiments disclosed in the specification unless the preceding description explicitly defines such terms. The inventors reserve the right to add additional claims after filing the application to pursue additional claim forms for other aspects of the invention.

The invention claimed is:

1. A method of hydrogenating an unsaturated feedstock, comprising:
    activating a nickel-based catalyst at a first temperature of at least about 100° C. in the presence of a process gas and an unsaturated fat component, wherein activating the nickel-based catalyst includes hydrogenating the unsaturated fat component such that the catalyst is dispersed in a hydrogenated fat matrix to form an activated catalyst composition; and, thereafter,
    contacting the unsaturated feedstock with the activated catalyst composition and hydrogenating the unsaturated feedstock by sustaining a hydrogenation reaction at a second temperature of no greater than about 70° C., the feedstock comprising at least one unsaturated organic component.

2. A method of hydrogenating a feedstock having at least one unsaturated organic component, the method comprising:
    activating a nickel-based catalyst at a first temperature of at least about 100° C. in the presence of a process gas and a fat component to form an activated catalyst composition;
    contacting the unsaturated feedstock with the activated catalyst composition and hydrogenating the unsaturated feedstock by sustaining a hydrogenation reaction at a second temperature of no greater than about 70° C., wherein hydrogenating the unsaturated feedstock produces a hydrogenated feedstock; and
    cooling the hydrogenated feedstock from the second temperature to a third temperature under a hydrogen atmosphere.

3. The method of claim 2 wherein the process gas comprises nitrogen.

4. The method of claim 1 wherein the second temperature is no greater than about 60° C.

5. The method of claim 1 wherein the second temperature is no greater than about 50° C.

6. The method of claim 1 wherein the second temperature is about 0-60° C.

7. The method of claim 1 wherein the second temperature is about 20-50° C.

8. The method of claim 1 wherein the second temperature changes over the course of the hydrogenation reaction, the hydrogenation reaction being initiated at a second temperature no greater than about 50° C.

9. The method of claim 1 wherein the second temperature changes over the course of the hydrogenation reaction, the hydrogenation reaction being initiated at a second temperature no greater than about 50° C., the hydrogenation reaction being completed without exceeding about 70° C.

10. The method of claim 1 wherein the hydrogenation reaction at the second temperature changes an Iodine Value of the feedstock, the Iodine Value changing at an average rate of no less than about 5/hour.

11. The method of claim 1 wherein the hydrogenation reaction at the second temperature changes an Iodine Value of the feedstock, the Iodine Value changing at an average rate of about 6-40/hour.

12. The method of claim 1 wherein hydrogenating the unsaturated feedstock includes delivering a hydrogenation gas to the feedstock, the hydrogenation gas consisting essentially of hydrogen.

13. The method of claim 1 wherein the activated catalyst composition has a total nickel content of about 2-35 weight percent.

14. The method of claim 1 wherein the activated catalyst composition has a total nickel content of about 2-35 weight percent, and nickel comprises no more than about 1 weight percent of the combined unsaturated feedstock and activated catalyst composition.

15. The method of claim 1 wherein the activated catalyst is dispersed in the fat component, the fat component being a solid at room temperature and liquid at the first temperature.

16. The method of claim 1 wherein contacting the unsaturated feedstock with the activated catalyst composition comprises dispersing the nickel-based catalyst in the unsaturated feedstock.

17. The method of claim 1 wherein the feedstock comprises an oil and the at least one unsaturated organic component comprises a polyunsaturated fatty acid.

18. The method of claim 1 wherein the at least one unsaturated organic component comprises an unsaturated hydrocarbon.

19. The method of claim 1 wherein the hydrogenated fat matrix of the activated catalyst composition has a melting point that is higher than the second temperature.

20. The method of claim 1 wherein the hydrogenated fat matrix of the activated catalyst composition has a melting point that is no higher than the second temperature.

21. The method of claim 1 wherein the hydrogenated fat matrix has a melting point that is higher than the second temperature.

22. A method of hydrogenating an unsaturated feedstock, comprising:
    activating a catalyst composition by heating a nickel-based catalyst to a first temperature of at least about 100° C. in the presence of a process gas and a fat component; and, thereafter, contacting the unsaturated feedstock with the activated catalyst composition and hydrogenating the unsaturated feedstock by sustaining a hydrogenation reaction at a second temperature of no greater than about 70° C., the feedstock comprising at least one unsaturated organic component, wherein a fat matrix of the activated catalyst composition has a melting point that is higher than the second temperature, and wherein the activated catalyst composition is at a temperature at least as high as the melting point when added to the unsaturated feedstock.

23. A method of hydrogenating an unsaturated feedstock, comprising:
activating a catalyst composition by heating a nickel-based catalyst to a first temperature of at least about 100° C. in the presence of a process gas and a fat component;
introducing hydrogen into the unsaturated feedstock; and, thereafter,
contacting the unsaturated feedstock with the activated catalyst composition and hydrogenating the unsaturated feedstock by sustaining a hydrogenation reaction at a second temperature of no greater than about 70° C., the feedstock comprising at least one unsaturated organic component.

24. The method of claim 1 wherein the activated catalyst composition is substantially the only catalyst source during the hydrogenation of the feedstock.

25. The method of claim 2 wherein the process gas comprises hydrogen.

26. The method of claim 25 wherein cooling the hydrogenated feedstock from the second temperature to a third temperature includes cooling from the second temperature to a third temperature of no greater than about 35° C. under a hydrogen atmosphere.

27. A method of hydrogenating an unsaturated oil having an initial Iodine Value and an initial fatty acid content including at least about 4 weight percent C018:3, the method comprising:
dispersing a nickel-based catalyst in the oil;
delivering hydrogen to the oil; and
hydrogenating the oil at a hydrogenation temperature no greater than about 70° C. for a hydrogenation time to yield a hydrogenated oil having a modified Iodine Value and including a modified fatty acid content, wherein the hydrogenated oil is no more solid than semi-liquid at 25° C., an absolute difference between the initial Iodine Value and the modified Iodine Value divided by the hydrogenation time defines an average Iodine Value change rate of no less than about 5/hour, no more than about 2.5% of the modified fatty acid content comprises C18:3, and no more than about 6% of the modified fatty acid content comprises trans-fatty acids.

28. The method of claim 27 wherein the oil is at the hydrogenation temperature when initiating the hydrogenation and the oil is hydrogenated without adding external heat.

29. The method of claim 27 wherein hydrogen is delivered to the oil before dispersing the nickel-based catalyst in the oil.

30. The method of claim 27 wherein the nickel-based catalyst is included in a catalyst composition that also comprises a fat matrix.

31. The method of claim 30 wherein dispersing the nickel-based catalyst comprises melting the fat matrix.

32. The method of claim 30 wherein the fat matrix has a melting point that is higher than the hydrogenation temperature.

33. The method of claim 27 wherein nickel comprises no more than about 1 weight percent of the combined oil and nickel-based catalyst.

34. The method of claim 27 wherein the hydrogenation temperature is no greater than about 50° C.

35. The method of claim 27 wherein the hydrogenation temperature is about 20-50° C.

36. The method of claim 27 wherein the hydrogenation temperature changes over the course of the hydrogenation time, the hydrogenation reaction being initiated at a hydrogenation temperature no greater than about 50° C.

37. The method of claim 27 wherein the hydrogenation temperature changes over the course of the hydrogenation time, the hydrogenation reaction being initiated at a hydrogenation temperature no greater than about 50° C. and the hydrogenation temperature not exceeding about 70° C. during the hydrogenation time.

38. The method of claim 27 wherein the average Iodine Value change rate is between about 6/hour and about 30/hour.

39. The method of claim 27 wherein delivering hydrogen to the oil comprises delivering a gas consisting essentially of hydrogen.

40. The method of claim 27 wherein the nickel-based catalyst is substantially the only catalyst source during the hydrogenation of the oil.

41. The method of claim 27 further comprising cooling the hydrogenated oil from the hydrogenation temperature under a hydrogen atmosphere.

42. The method of claim 27 further comprising cooling the partially hydrogenated feedstock from the second temperature to a third temperature of no greater than about 35° C. under a hydrogen atmosphere.

43. A method of hydrogenating an oil having an initial Iodine Value and an initial induction period, the method comprising:
dispersing a nickel-based catalyst in the oil;
delivering hydrogen to the oil; and
hydrogenating the oil at a hydrogenation temperature no greater than about 70° C. for a hydrogenation time to yield a hydrogenated oil having a modified Iodine Value and a modified induction period, wherein an absolute difference between the initial Iodine Value and the modified Iodine Value divided by the hydrogenation time defines an average Iodine Value change rate of no less than about 5/hour, and the modified induction period is at least about twice the initial induction period.

44. The method of claim 43 wherein the initial induction period and the modified induction period are measured at about 120° C.

45. The method of claim 43 wherein no more than about 6 weight percent of a total fatty acid content of the hydrogenated oil is trans-fatty acid.

46. The method of claim 43 wherein the hydrogenation temperature is about 20-50° C.

47. The method of claim 43 wherein nickel comprises no more than about 1 weight percent of the combined oil and nickel-based catalyst.

48. A method of hydrogenating an edible oil having an initial Iodine Value and an initial fatty acid content that includes at least about 4 weight percent C18:3, the method comprising:
providing a catalyst composition including a fat component and a nickel-based catalyst that has been heated to a first temperature in the presence of hydrogen;
dispersing the catalyst composition in the oil;
delivering hydrogen to the oil; and
hydrogenating the oil at a second temperature to yield a hydrogenated oil having a modified Iodine Value and including a modified fatty acid content, wherein:
the second temperature is less than the first temperature;

the hydrogenated oil is no more solid than semi-liquid at 25° C.;

an absolute difference between the initial Iodine Value and the modified Iodine Value divided by the hydrogenation time defines an average Iodine Value change rate of about 6-40/hour;

no more than about 2 weight percent of the modified fatty acid content comprises C18:3; and no more than about 5 weight percent of the modified fatty acid content comprises trans-fatty acids.

49. The method of claim 48 wherein dispersing the catalyst composition comprises contacting the catalyst composition, which is at a third temperature, with the oil, the third temperature being greater than the second temperature and at least as great as a melting point of the fat composition.

50. The method of claim 49 wherein the third temperature is no greater than the first temperature.

51. The method of claim 49 wherein the edible oil has an initial induction period and the hydrogenated oil has an induction period that is at least about twice the initial induction period.

52. A partially hydrogenated edible oil comprising an oil selected from a group consisting of soybean oil and canola oil, wherein the partially hydrogenated edible oil:

is no more solid than semi-liquid at about 25° C.;

has a C18:3 content of no greater than about 2.5 weight percent;

has a trans-fatty acid content of no more than about 6 weight percent; and has a ratio of C18 content to the trans-fatty acid content (C18:TFA) of at least about 1.2.

53. The partially hydrogenated edible oil of claim 52 wherein the oil comprises soybean oil.

54. The partially hydrogenated edible oil of claim 52 wherein the oil comprises canola oil.

55. The partially hydrogenated edible oil of claim 52 wherein the C18:TFA ratio is at least about 1.5.

56. The partially hydrogenated edible oil of claim 52 wherein the C18:TFA ratio is at least about 2.

57. The partially hydrogenated edible oil of claim 52 wherein a ratio cis- to trans- forms of C18:1, C18:2 and C18:3 fatty acids (CFA : TFA) is at least about 6.

58. The partially hydrogenated edible oil of claim 52 wherein a ratio cis- to trans- forms of C18:1, C18:2 and C18:3 fatty acids (CFA : TFA) is at least about 12.

59. A partially hydrogenated edible oil comprising an oil selected from a group consisting of soybean oil and canola oil, wherein the partially hydrogenated edible oil:

is no more solid than semi-liquid at about 25° C.;

has a C18:3 content of no greater than about 2.5 weight percent;

has a trans-fatty acid content of no more than about 6 weight percent; and has a ratio of cis- to trans- forms of C18:1, C18:2 and C18:3 fatty acids (CFA: TEA) of at least about 6.

60. The partially hydrogenated edible oil of claim 59 wherein the CFA: TFA ratio is at least about 9.

61. The partially hydrogenated edible oil of claim 59 wherein the CFA: TFA ratio is at least about 12.

62. The partially hydrogenated edible oil of claim 59 wherein a ratio of C18 content to the trans-fatty acid content (C18:TFA) is at least about 1.5.

63. The partially hydrogenated edible oil of claim 59 wherein a ratio of C18 content to the trans-fatty acid content (C18:TFA) is at least about 2.

64. The method of claim 27 wherein the hydrogenated oil that is no more solid than semi-liquid at 25° C. has a solid fat content of no greater than 20 weight percent at 25° C.

65. The method of claim 48 wherein the hydrogenated oil that is no more solid than semi-liquid at 25° C. has a solid fat content of no greater than 20 weight percent at 25° C.

66. The partially hydrogenated edible oil of claim 52 wherein the oil has a solid fat content of no greater than 20 weight percent at 25° C.

67. The partially hydrogenated edible oil of claim 59 wherein the oil has a solid fat content of no greater than 20 weight percent at 25° C.

68. A margarine composition comprising water and a partially hydrogenated edible oil, the partially hydrogenated edible oil comprising an oil selected from a group consisting of soybean oil and canola oil, wherein the partially hydrogenated edible oil:

is no more solid than semi-liquid at about 25° C.;

has a C18:3 content of no greater than about 2.5 weight percent;

has a trans-fatty acid content of no more than about 6 weight percent; and has a ratio of C18 content to the trans-fatty acid content (C18:TFA) of at least about 1.2.

69. The margarine composition of claim 68 wherein the partially hydrogenated edible oil has a ratio of cis- to trans- forms of C18:1, C18:2 and C18:3 fatty acids (CFA:TFA) of at least about 6.

* * * * *

UNITED STATES PATENT AND TRADEMARK OFFICE
CERTIFICATE OF CORRECTION

PATENT NO. : 7,585,990 B2
APPLICATION NO. : 10/750457
DATED : September 8, 2009
INVENTOR(S) : Van Toor et al.

Page 1 of 1

It is certified that error appears in the above-identified patent and that said Letters Patent is hereby corrected as shown below:

Title Page; item (56);
On page 2, in column 2, under "Other Publications", line 1, delete "Edfible" and insert -- Edible --, therefor.

On page 3, in column 2, under "Other Publications", line 35, delete "Vegatable Oils?"," and insert -- Vegetable Oils?", --, therefor.

On page 3, in column 2, under "Other Publications", line 49, delete "Equiped" and insert -- Equipped --, therefor.

In column 2, line 5, delete "monoenic" and insert -- monoenoic --, therefor.

In column 29, line 29, in claim 26, delete "Claim 25" and insert -- Claim 2 --, therefor.

In column 29, line 36, in claim 27, delete "C018:3," and insert -- C18:3, --, therefor.

In column 32, line 7, in claim 59, delete "(CFA: TEA)" and insert -- (CFA: TFA) --, therefor.

Signed and Sealed this

Fifteenth Day of December, 2009

David J. Kappos
*Director of the United States Patent and Trademark Office*